US006957303B2

(12) United States Patent
Fujimoto et al.

(10) Patent No.: US 6,957,303 B2
(45) Date of Patent: Oct. 18, 2005

(54) SYSTEM AND MANAGING METHOD FOR CLUSTER-TYPE STORAGE

(75) Inventors: Kazuhisa Fujimoto, Kokubunji (JP); Mutsumi Hosoya, Fujimi (JP); Kentaro Shimada, Tokyo (JP); Akira Yamamoto, Sagamihara (JP); Naoko Iwami, Sagamihara (JP); Yasutomo Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 201 days.

(21) Appl. No.: 10/422,734

(22) Filed: Apr. 25, 2003

(65) Prior Publication Data

US 2004/0103244 A1 May 27, 2004

(30) Foreign Application Priority Data

Nov. 26, 2002 (JP) .................................. P2002-341664
Jan. 14, 2003 (JP) .................................. P2003-005245

(51) Int. Cl.[7] .............................................. G06F 12/00
(52) U.S. Cl. ........................ 711/114; 711/4; 711/112; 711/113; 711/118; 711/202; 709/218; 709/227; 709/230; 709/231; 709/244; 709/249; 709/250
(58) Field of Search ................................ 711/4, 112, 113, 711/114, 118, 202; 709/218, 227, 230, 231, 244, 249, 250

(56) References Cited

U.S. PATENT DOCUMENTS

| 5,469,548 | A | 11/1995 | Callison et al. |
| 6,289,398 | B1 | 9/2001 | Stallmo et al. |
| 6,542,954 | B1 * | 4/2003 | Aruga .......................... 710/316 |
| 6,542,961 | B1 * | 4/2003 | Matsunami et al. ........ 711/114 |
| 6,606,698 | B2 | 8/2003 | Fradette |
| 6,708,232 | B2 * | 3/2004 | Obara .......................... 710/11 |
| 6,813,676 | B1 * | 11/2004 | Henry et al. ................. 710/316 |
| 2002/0004845 | A1 | 1/2002 | Yamamoto et al. |
| 2002/0091898 | A1 | 7/2002 | Matsunami et al. |
| 2003/0093541 | A1 | 5/2003 | Lolayekar et al. |
| 2003/0099254 | A1 | 5/2003 | Richter |
| 2003/0130999 | A1 | 7/2003 | Probert, Jr. et al. |
| 2003/0236945 | A1 | 12/2003 | Nahum |
| 2004/0010660 | A1 | 1/2004 | Konshak et al. |
| 2004/0098529 | A1 | 5/2004 | Sangveraphunski et al. |
| 2004/0221105 | A1 * | 11/2004 | Fujimoto et al. ........... 711/114 |

FOREIGN PATENT DOCUMENTS

| JP | 7-152491 | 11/1993 |
| JP | 9-51347 | 8/1995 |

* cited by examiner

*Primary Examiner*—Donald Sparks
*Assistant Examiner*—Bao Q Truong
(74) *Attorney, Agent, or Firm*—Reed Smith LLP; Stanley P. Fisher, Esq.; Juan Carlos A. Marquez, Esq.

(57) ABSTRACT

The storage system is configured to expand from small to large configurations at a reasonable cost with performance decided approximately to a target system scale. The storage system has a plurality of protocol transformation units, each used for transforming a protocol to be exchanged with the server or disk drives, and a plurality of data caching control units, each having a cache memory unit for storing data and a function for controlling the cache memory unit. The plurality of data cashing control units are divided into a plurality of control clusters while the cache memory unit is controlled only in its corresponding control cluster independently and the system management unit is connected to an interconnection, such that the system management unit manages the plurality of protocol transformation units and the plurality of control clusters are managed integrally as one system.

15 Claims, 27 Drawing Sheets

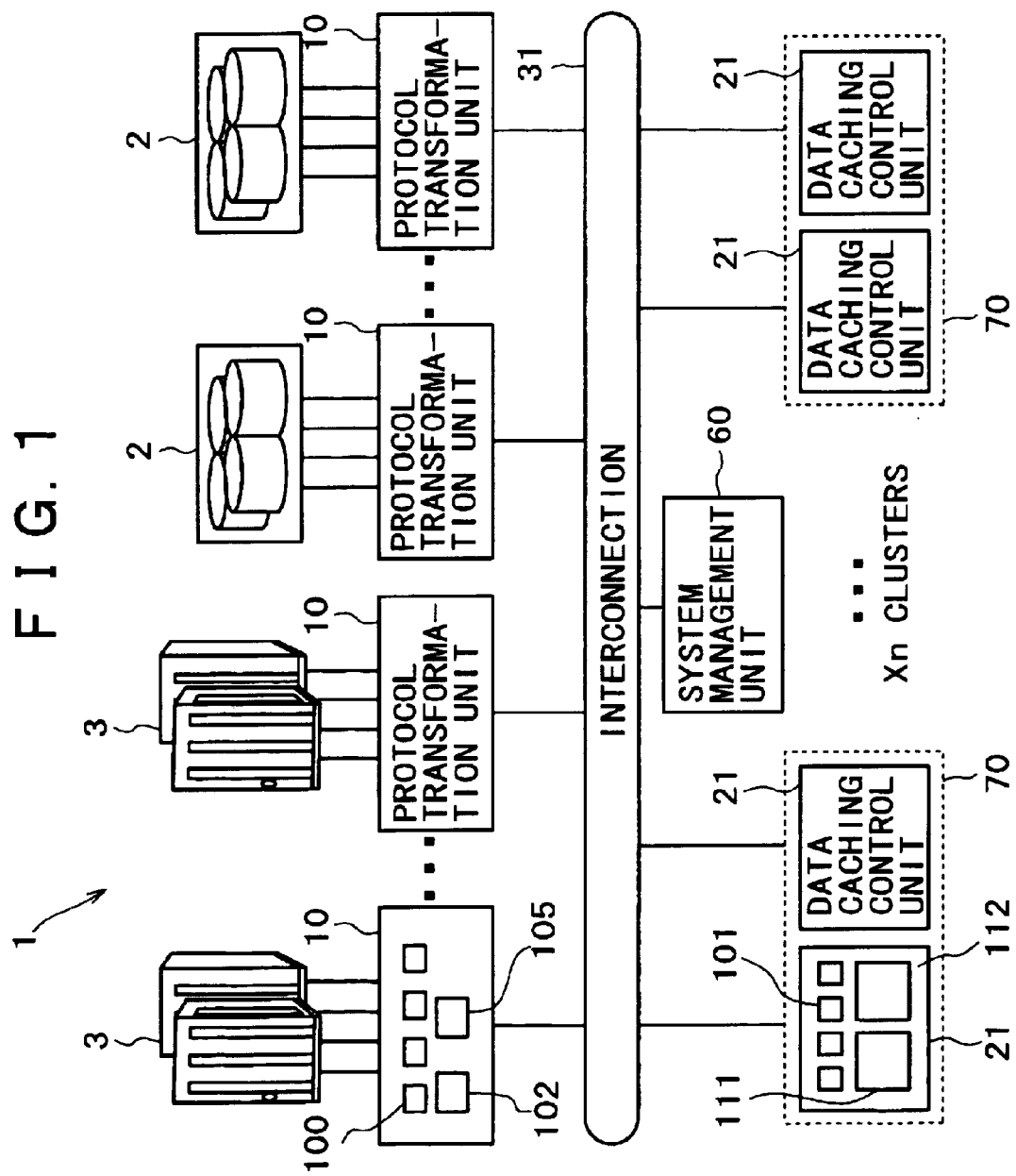

F I G. 5
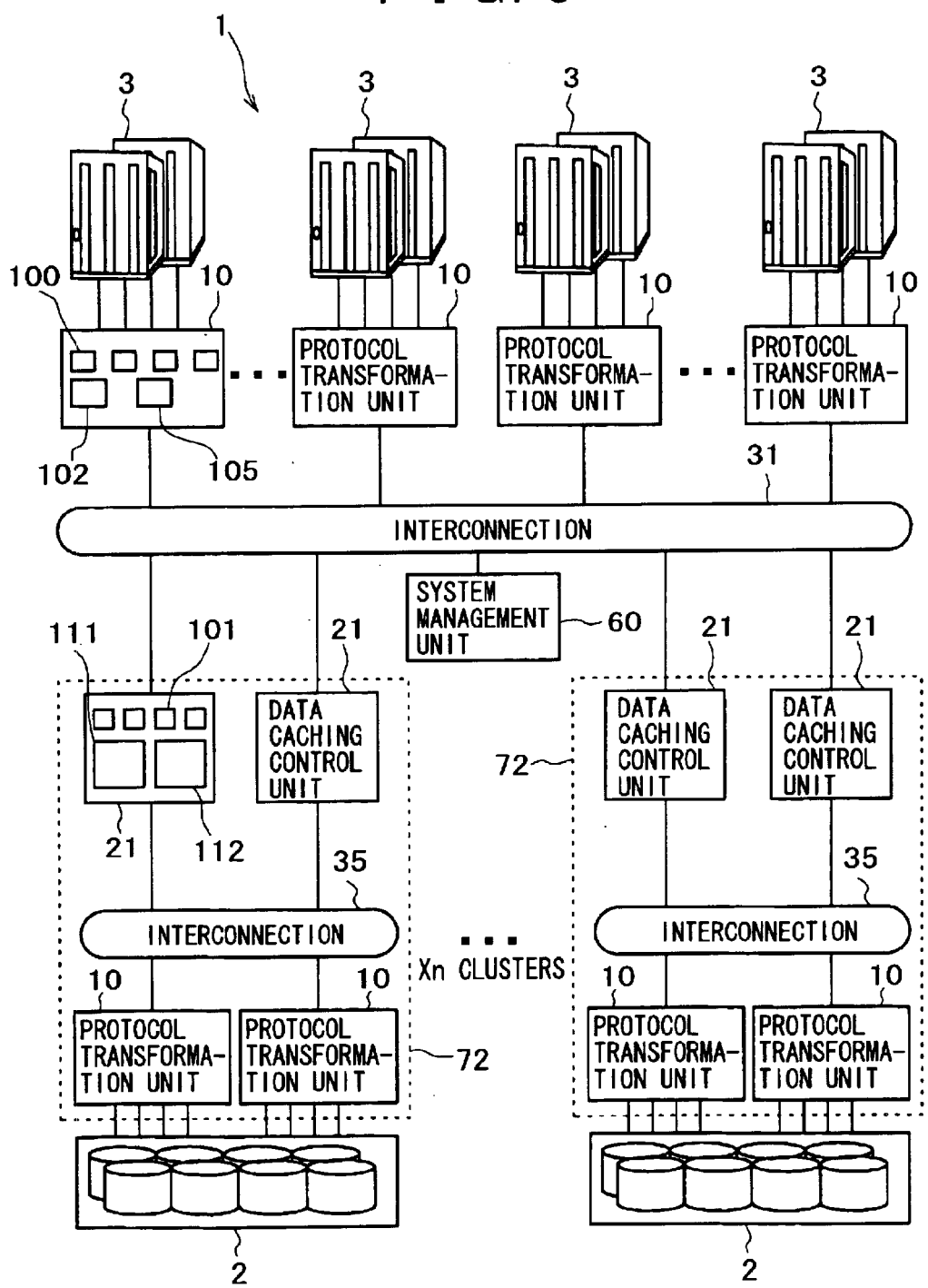

F I G. 1 1
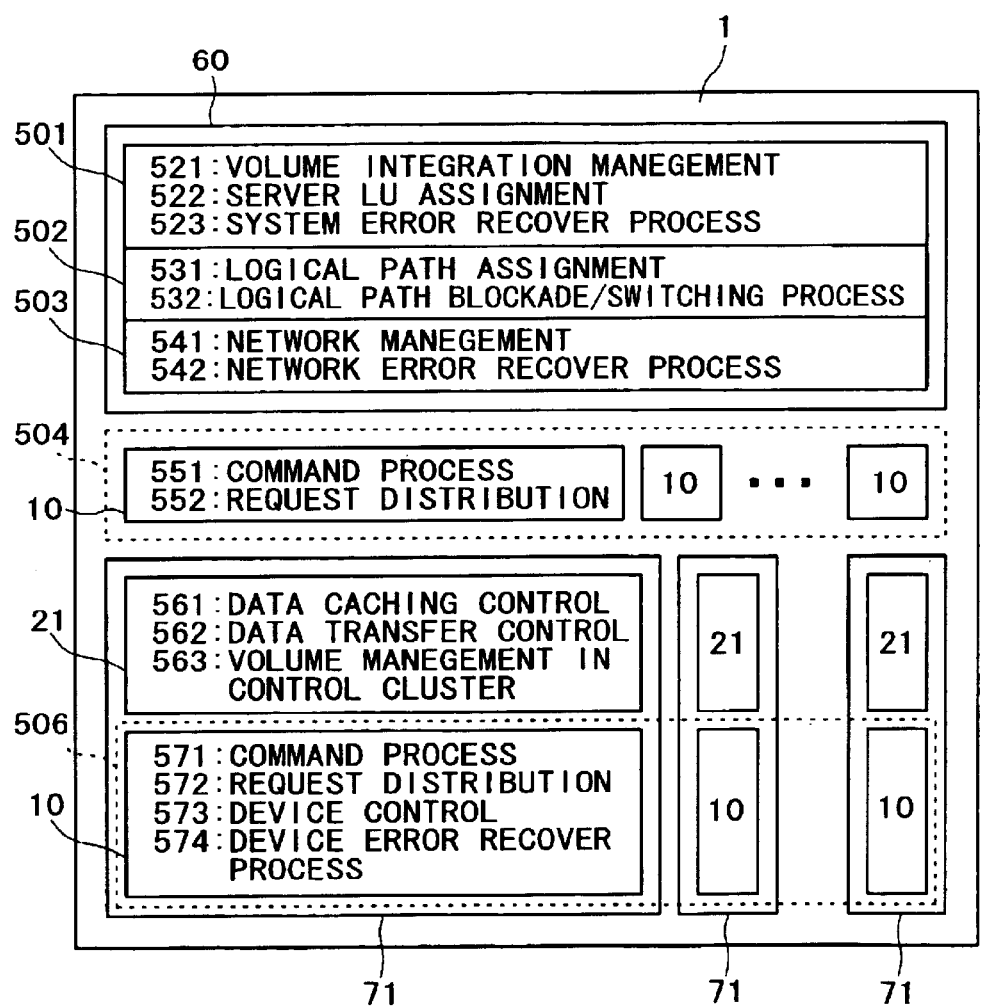

F I G. 1 2

| VVOL2# | PA# | VVOL1# | PDEV# | RAID CLASS | CAPACITY |
|---|---|---|---|---|---|
| 0 | 0 | 0 | 0, 1, 2, 3, | 5 | 240 GB |
| 1 | | 2 | 8, 9, A, B | 5 | 240 GB |
| : | | : | : | : | : |
| 8 | 1 | 1 | 4, 5, 6, 7 | 1 | 160 GB |
| 9 | | 3 | C, D, E, F | : | 320 GB |
| : | | : | : | : | : |

FIG. 13

| VVOL3# | VVOL2# | CA# | ADDRESS IN VVOL1 | CAPACITY |
|---|---|---|---|---|
| 00 | 0 | 0 | 0x0000000000~0x03FFFFFFFF | 16 GB |
| .. | .. | .. | .. | .. |
| 0F |  | 0 | 0x3C00000000~0x03FFFFFFFF | 16 GB |
| .. | .. | .. | .. | .. |
| A0 | 8 | 1 | 0x0000000000~0x00FFFFFFFF | 4 GB |
| .. | .. | .. | .. | .. |

F I G. 1 4

| REAL LUN | VVOL3# | RAID CLASS | CA# | CAPACITY |
|---|---|---|---|---|
| 0 | 00 | 5 | 0 | 16 GB |
| 1 | 01, 02 | 5 | | 32 GB |
| 2 | 03 | 0 | | 16 GB |
| ⋮ | ⋮ | ⋮ | | ⋮ |
| B | A0, A1, A2 | 1 | 1, 2 | 12 GB |
| ⋮ | ⋮ | ⋮ | ⋮ | ⋮ |

653

F I G. 1 5

| SERVER NO. | VIRTUAL LUN | REAL LUN | PA NO. | CHANNEL NO. | CA NO. |
|---|---|---|---|---|---|
| 0 | LUN$_A$ 0, 1, 2, 3 | 0, 1, 3, 8 | 0 | 0 | 0 |
| 1 | LUN$_B$ 0, 1, 2 | 2, 4, 5 | 1 | 1 | 0 |
| 2 | LUN$_C$ 0, 1, 2, 3, 4 | 6, 7, 9, A, F | 0 | 0 | 1 |
| .. | .. | .. | .. | .. | .. |

F I G. 2 3
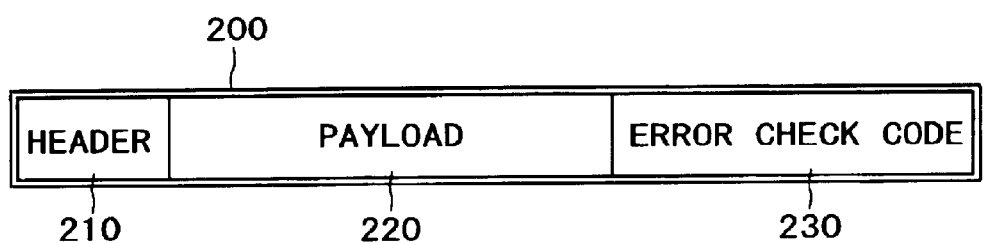

SYSTEM AND MANAGING METHOD FOR CLUSTER-TYPE STORAGE

BACKGROUND OF THE INVENTION

1. Field of the Invention

The present invention generally relates storage systems on computers and more particularly, to storage systems enabled to expand from small to large configurations, and to management methods thereof.

2. Discussion of Background

As explained in JP-A No.242434/2000, along with the penetration of IT systems in corporations and spread of the cooperation of those corporations through the IT systems due to the progress of the Internet, the roles of the storage systems for storing data processed in such IT systems is becoming important more and more as the core of the IT systems. And, to cope with such the roles, there have been proposed various types of storage systems enabled to correspond to small to large configurations.

For example, one of such the storage systems is a conventional storage system structured as shown in FIG. 2. This storage system comprises a plurality of channel IF units, each used for sending/receiving data to/from a server 3, a plurality of disk IF units 16, each used for sending/receiving data to/from hard drives 2, a cache memory unit 14 for storing data to be stored in the hard drives 2 temporarily, and a control memory unit 15 for storing control information (ex., information related to the data transfer control in the storage system 8 and management information of data to be stored in the hard drives 2) related to the storage system 8. In the storage system, an interconnection 41 is used for the connection between the plurality of channel IF units/disk IF units and the plurality of cache memory unit 15 while another interconnection 42 is used for the connection between the plurality of channel IF units 11/disk IF units and the control memory unit 15. Each of the interconnections 41 and 42 is generally configured by common buses or switches.

Consequently, the storage system 8 is configured so that the cache memory unit 14 and the control memory unit 15 are accessed from all the channel IF units 11/disk IF units 16.

Each channel IF unit 11 includes an interface (host IF 104) with the server 3, a microprocessor 103 for controlling the input from output to the server 3, a memory access unit 106 for controlling the access to the cache memory unit 14, and a memory access unit 107 for controlling the access to the control memory unit 15. Each disk IF unit 16 includes an interface (disk IF 105) with the hard drives 2, a microprocessor 103 for controlling the input from or output to the hard drives 2, a memory access unit 106 for controlling the access to the cache memory unit 14, and a memory access unit for controlling the access to the control memory unit 15. Each disk IF unit 16 also executes the RAID function.

In the above storage system 8, the channel IF units 11 for controlling data transfer to/from the servers 3 and the disk IF units 16 for controlling the data transfer to/from the hard drives 2 are separated from each other and the data transfer between the channel IF units 11 and the disk IF units 16 is controlled through the cache memory unit 14 and the control memory unit 15, so that it has been possible to change the number of both of the channel IF units 11 and the disk IF units flexibly. This is why the storage system 8 has been enabled to correspond to small to large scale configurations.

And, in the conventional technique disclosed in JP-A No.242434/2000, as shown in FIG. 21, a plurality of disk array units 4 are connected to a plurality of servers 3 through a disk array switch 5 and the system configuration management unit 60 connected to the disk array switch 5 and the disk array units 4 manages those disk array units 4 integrally as one storage system 9.

In large scale corporations such as banks, securities and brokerage firms, telephone companies, etc., a marked tendency to integrate their computers and storages having been dispersed in places into computer systems and storage systems and placed in data centers is seen lately, thereby reducing the costs of the operation, maintenance, and management of those systems.

On the other hand, a tendency to suppress the initial investments to IT systems and expand the system scales according to the expansion of business scales is also seen in those corporations under the depression started by the collapse of economic bubble and accelerated by the collapse of IT bubble and the terrorism occurred in the USA. And accordingly, the storage systems have been required to have a scalability of both cost and performance that enable each storage system to expand with a reasonable investment in accordance with an expected business scale.

According to the conventional technique shown in FIG. 2, the data transfer between all the channel IF units 11 and all the disk IF units 16 is controlled through the cache memory unit 14 and the control memory unit 15, thereby data is read/written from/to the servers 3 to/from the hard drives 2. The access load of all the channel IF units 11 and all the disk IF units 16 is thus concentrated in the cache memory unit 14 and the control memory unit 15.

And, the required performance of such the storage system (the input/output frequency of data per unit time and the data transfer rate per unit time) is becoming higher and higher every year. To meet such the requirement, therefore, the data transfer rate of both of the channel IF unit and the disk IF unit is also required to be improved.

As described above, because the data transfer between all the channel IF units 11 and all the disk IF units 16 is controlled through the cache memory unit 14 and the control memory unit 15 in the conventional technique, the access load to the channel IF units 11 and the disk IF units 16 increases when the data transfer rate of the channel IF units 11 and the disk IF units 16 is improved. And, such the increase of the access load becomes a bottleneck that makes it difficult to improve the performance of the storage system 8. This has been a problem of the conventional technique.

On the other hand, it is possible to improve such the access performance that enables both the cache memory unit 14 and the control memory unit 15 to be scaled up significantly to cope with the above increase of the access load. In this case, however, each of the cache memory unit 14 and the control memory unit 15 comes to be managed as a shared memory space to enable the units 14 and 15 to be accessed from all the channel IF units 11 and all the disk IF units 16. Therefore, if the cache memory unit 15 and/or control memory unit 15 is scaled up significantly, it becomes difficult to reduce the cost of the storage system 8 in a small configuration, thereby it becomes difficult to provide small configuration systems at low prices. This has been another problem of the conventional technique.

Furthermore, in the conventional technique shown in FIG. 21, it is possible to increase the number of disk array units 4 and the servers 3 that are connectable by increasing the number of ports of the disk array switch 5 and connecting a plurality of disk array switches 5 in multiple steps, so that the storage system is realized so as to be enabled to correspond to small to large configurations scalably. However, because each server 3 accesses each disk array unit 4 through the disk array switch 5 in that case, the disk array switch 5 is required to transform the server—disk array switch protocol to a protocol used in the disk array unit 5 through its interface unit with the server 3, as well as to transform the protocol used in the disk array unit 5 to the disk array switch—disk array unit protocol through its interface with the disk array unit 4 in the disk array switch 5. And accordingly, the response performance of the conventional technique becomes lower than the direct access to the disk array unit without using the disk array switch. This has been a problem of the conventional technique.

Under such circumstances, it is an object of the present invention to provide a storage system enabled to expand from small to large scale configurations flexibly at a reasonable price/performance appropriately to the expected system scale.

More concretely, the object of the present invention is to provide a storage system having a scalability of both cost and performance so as to correspond to small to large scale configurations by eliminating the bottleneck in the shared memory of the conventional storage system and reducing the costs of small configuration systems.

SUMMARY OF THE INVENTION

Broadly speaking, the present invention provides a storage system configured so as to expand from small to large configurations at a reasonable cost, and a method for managing such a storage system. It should be appreciated that the present invention can be implemented in numerous ways, including as a process, an apparatus, a system, a device or a method. Several inventive embodiments of the present invention are described below.

In one embodiment, a storage system that comprises an interface with an external equipment; a plurality of first protocol transformation units, each configured to transform one of a read and a write protocol of data to be exchanged with the external equipment into an internal protocol used in the storage system; a plurality of second protocol transformation units, each having an interface with a hard disk unit and each configured to transform one of a read and write protocol of data to be exchanged with the hard disk unit into to an internal protocol used in the storage system; a plurality of data caching control units, each having a cache memory for storing data to be one of read from and written in the hard disk unit, and a function for controlling the cache memory; a first interconnection configured to connect the plurality of first protocol transformation units and the plurality of data caching control units, wherein the plurality of data caching control units and the plurality of second protocol transformation units are divided into a plurality of control clusters, each including a given number of the data caching control units and a given number of the second protocol transformation units respectively, and wherein a second interconnection is configured to connect the data caching control units and the second protocol transformation units in each of the control clusters, and wherein the cache memory of the data caching control unit in the control cluster stores only the data to be stored in the plurality of hard disk unit connected to the second protocol transformation units in the control cluster, and wherein the cache memory is controlled and the plurality of hard disk units are managed only in a corresponding control cluster independently; and a system management unit configured to manage the plurality of first protocol transformation units and the plurality of control clusters integrally as one system.

In another embodiment, a storage system is provided comprising an interface with an external equipment; a plurality of first protocol transformation units, each configured to transform one of a read and a write protocol of data to be exchanged with the external equipment into an internal protocol used in the storage system; an interface with a hard disk unit; a plurality of second protocol transformation units, each configured to transform one of a read and a write protocol of data to be exchanged with the hard disk unit into to an internal protocol used in the system; and a data caching control unit having a cache memory for storing data to be one of read from or written to the hard disk unit, and a function for controlling the cache memory; an interconnection configured to connect the plurality of first and second protocol transformation units and the plurality of data caching control units, wherein the plurality of data caching control units and the plurality of second protocol transformation units are divided into a plurality of control clusters, each including a given number of data caching control units and a given number of second protocol transformation units respectively, and wherein the cache memory of each data caching control unit in each control cluster is configured to store only data to be stored in the plurality of hard disk units connected to the plurality of second protocol transformation units, and wherein the cache memory is controlled and the plurality of hard disk units are managed only in its corresponding control cluster independently; and a system management unit configured to manage the plurality of first protocol transformation units and the plurality of control clusters integrally as one system.

In still another embodiment, a storage system is provided comprising an interface with an external equipment; a plurality of first protocol transformation units, each configured to transform one of a read and a write protocol of data to be exchanged with the external equipment into an internal protocol used in the storage system; a plurality of second protocol transformation units, each having an interface with a hard disk unit and each configured to transform one of a read and write protocol of data to be exchanged with the hard disk unit into to an internal protocol used in the storage system; a plurality of data caching control units, each having a cache memory for storing data to be one of read from and written in the hard disk unit, and a function for controlling the cache memory; a first interconnection configured to connect the plurality of first protocol transformation units and the plurality of data caching control units, wherein the plurality of data caching control units and the plurality of second protocol transformation units are divided into a plurality of control clusters, each including a given number of the data caching control units and a given number of the second protocol transformation units respectively, and wherein a second interconnection is configured to connect the data caching control units and the second protocol transformation units in each of the control clusters, and wherein the cache memory of the data caching control unit in the control cluster stores only the data to be stored in the plurality of hard disk unit connected to the second protocol transformation units in the control cluster, and wherein the cache memory is controlled and the plurality of hard disk units are managed only in a corresponding control cluster independently; and a system management unit configured to manage the plurality of first protocol transformation units and the plurality of control clusters integrally as one system.

The invention encompasses other embodiments of a system, a method, an apparatus, and a computer-readable medium, which are configured as set forth above and with other features and alternatives.

BRIEF DESCRIPTION OF THE DRAWINGS

The present invention will be readily understood by the following detailed description in conjunction with the accompanying drawings. To facilitate this description, like reference numerals designate like structural elements.

FIG. 1 is a block diagram of a storage system in the first embodiment of the present invention;

FIG. 5 is a block diagram of a storage system in the second embodiment of the present invention;

FIG. 11 is a chart for describing a management configuration of the storage system of the present invention;

FIG. 12 is an example of a management table for managing the storage system of the present invention;

FIG. 13 is an example of another management table for managing the storage system of the present invention;

FIG. 14 is an example of another management table for managing the storage system of the present invention;

FIG. 15 is an example of still another management table for managing the storage system of the present invention;

FIG. 23 is a format of the packets transferred through an interconnection included in the storage system of the present invention;

DESCRIPTION OF THE PREFERRED EMBODIMENTS

An invention is disclosed for a storage system configured so as to expand from small to large configurations at a reasonable cost, and for a method for managing such a storage system. Numerous specific details are set forth in order to provide a thorough understanding of the present invention. It will be understood, however, to one skilled in the art, that the present invention may be practiced without some or all of these specific details.

Figure 6:
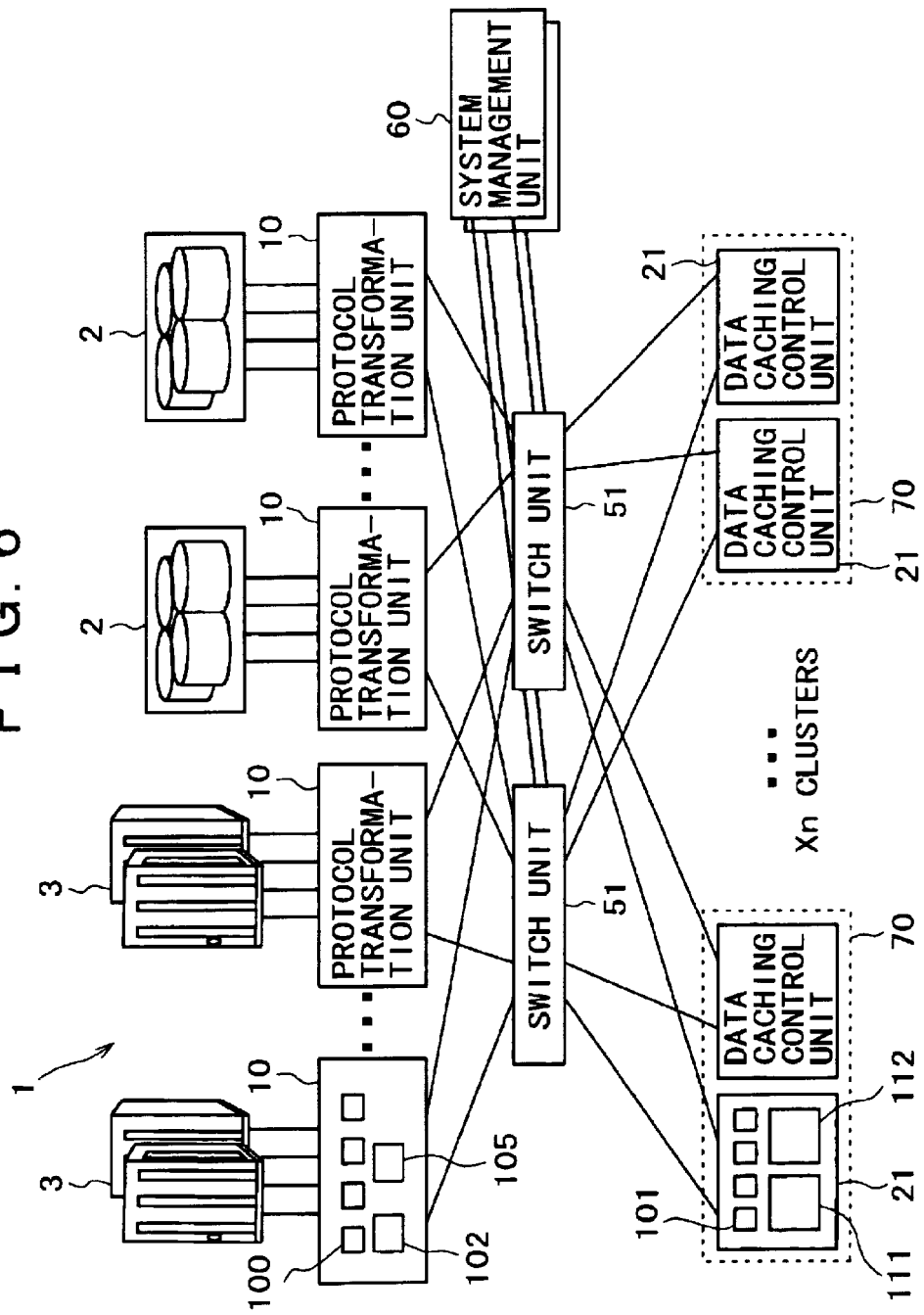
FIG. 6 is a detailed block diagram of the storage system with interconnections in the first embodiment of the present invention.

As shown in FIG. 1, a storage system 1 includes a plurality of protocol transformation units 10 that function as interfaces with a plurality of servers 3 and a plurality of hard drives 2, as well as a plurality of data caching control units 21, and a system management units 60. An interconnection 31 is used for the connection between the protocol transformation units 10, data caching control units 21 and the system management units 60. FIG. 6 shows a concrete example of the interconnection 31.

The interconnection 31 is configured by two switch units 51. One path is connected to each of the two switch units 51 from each of the protocol transformation units 10, the data caching control units 21, and the system management units 60. Consequently, two paths are allocated among each protocol transformation unit 10, each data caching control unit 21, and the system management units 60 to improve the system reliability. In addition, the system management units 60 is dualized. This is also effective to improve the reliability of the whole system.

Figure 8:
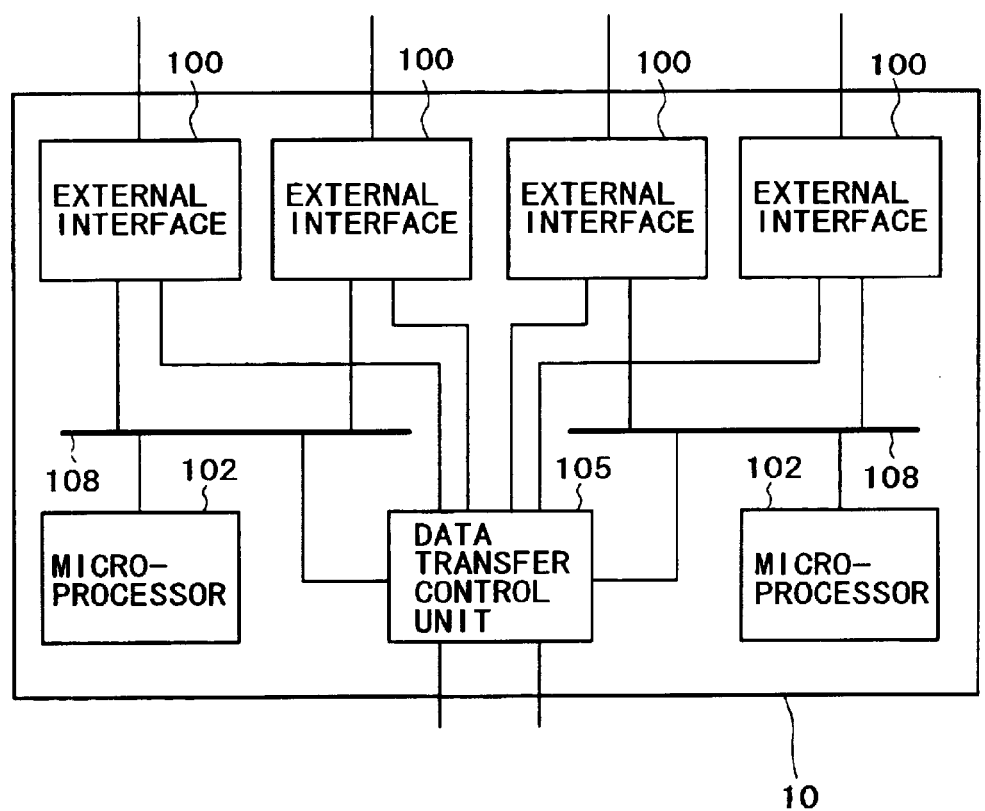
FIG. 8 is a block diagram of a protocol transformation unit included in the storage system of the present invention.

The number of each system component described above is just an example; it is varied freely. And, while the interconnection 31 uses switches, the interconnection device 31 may be configured by buses, for example; it is only required to transfer control information and data among the system components connected to each another. FIG. 8 shows a concrete example of such the protocol transformation unit 10.

Each protocol transformation unit 10 includes at least four interfaces (external IFs) 100 with the server 3 or hard drives 2, a data transfer control unit 105 used to control transfer of data and control information to or from a data caching control unit 21 or system management units 60, and two microprocessors 102. Each microprocessor 102 has a memory (not shown) connected thereto and used as the main memory.

The number of each component of the unit 10 described above is just an example; the number is varied freely. Each microprocessor 102 is connected to the external IFs and the data transfer control unit 105 through a common bus 108. Each external IF 100 is connected directly to the data transfer control unit 105. Each microprocessor 102 controls the external IF 100 and the data transfer control unit 105 to transform a read/write protocol of the data transferred between the server 3 or hard drives 2 and the external IF 100 to/from a data transfer protocol between the data caching control unit 21 or system management units 60 and the data transfer control unit 105. Consequently, the protocol transformation unit 10 transfers a read/write request issued from the server 3 to the target data caching control unit 21 or another protocol transformation unit 10. The protocol transformation unit 10 also transfers a read/write request issued from a data caching control unit 21 or another protocol transformation unit 10 to the hard drives 2.

The connection configuration among the microprocessors 102, the external IFs 100, and the data transfer control unit 105 described above is just an example; the connection configuration is varied freely. Each microprocessor 102 may control its corresponding external IFs 100 and the data transfer control unit 105; No problem will arise if data is transferred from any external IF 100 to the data transfer control unit 105.

Figure 9:
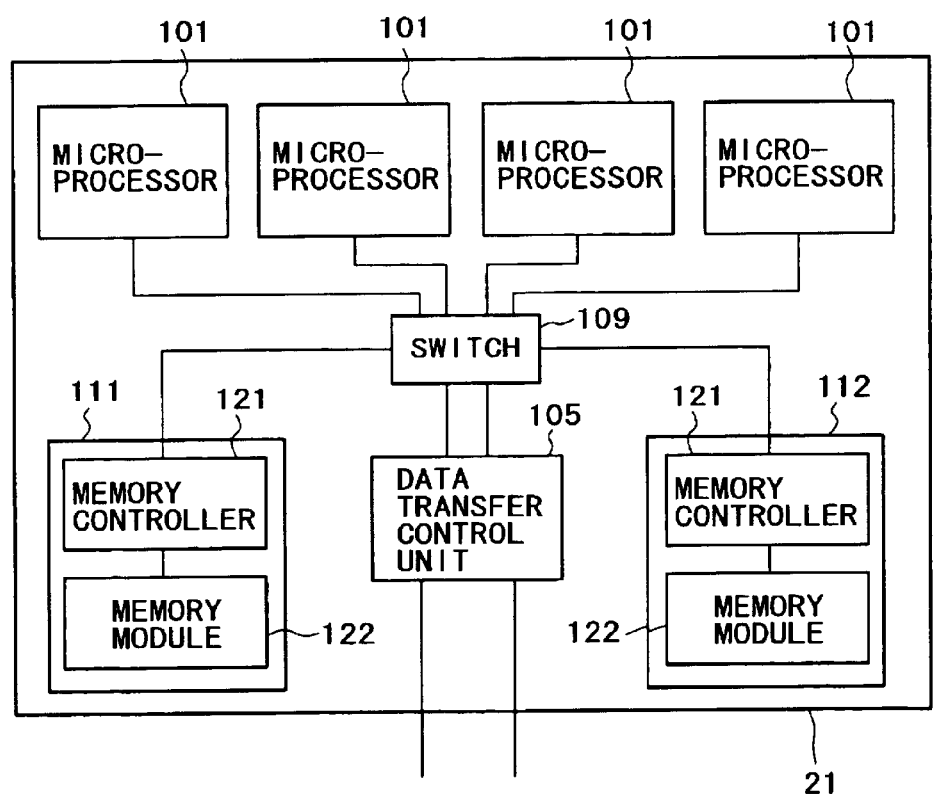
FIG. 9 is a block diagram of a data caching control unit included in the storage system of the present invention.

FIG. 9 shows a concrete example of the data caching control unit 21. Each data caching control unit 21 includes at least four microprocessors 101, a data transfer control unit 105 for controlling transfer of data and control information to/from a protocol transformation unit 10 or system management units 60, a cache memory unit 111 for storing data to be sent/received to/from the server 3 or hard drives 2 temporarily, a control memory unit 112 for storing control information related to the data transfer, the management of the cache memory unit 111, and the management of the hard drives 2. Each of the cache memory unit 111 and the control memory unit 112 is configured by a memory module 122 and a memory controller 121 for controlling the access to the memory module 122. Each of the cache memory unit 111 and the control memory unit 112 may be configured by the same memory controller 121 and the same memory module 122 so that both cache memory area and control memory area may be allocated in difference areas in one memory space. Each microprocessor 101 has a memory (not shown) connected thereto and used as the main memory. The four microprocessors 101 may also share the cache memory unit 111 and the control memory unit 112 as the main memory (SMP configuration).

The number of each component of the data caching control unit 21 described above is just an example; the number may be varied freely. Each microprocessor 101, the data cache memory unit 111, the control memory unit 112, and the data transfer control unit 105 are connected to each another through a switch 109. The microprocessor 101 controls reading/writing data from/in the cache memory, directory management in the cache memory, transfer of data to/from each protocol transformation unit 10, and sending/receiving of system management information to/from the system management units 60, according to the control information stored in the control memory unit 112. In addition, the microprocessor 101 executes a process for redundancy of data to be written in the hard drives 2 connected to the protocol transformation unit 10, that is, as a RAID processing. This RAID processing may be executed in the protocol transformation unit 10 with no problem.

The connection configuration among each microprocessor 101, the cache memory unit 111, the control memory unit 112, and the data transfer control unit 105 is just an example; the configuration may be varied on the presumption that the microprocessor 101 can control the cache memory unit 111, the control memory unit 112, and the data transfer control unit 105.

Figure 22:
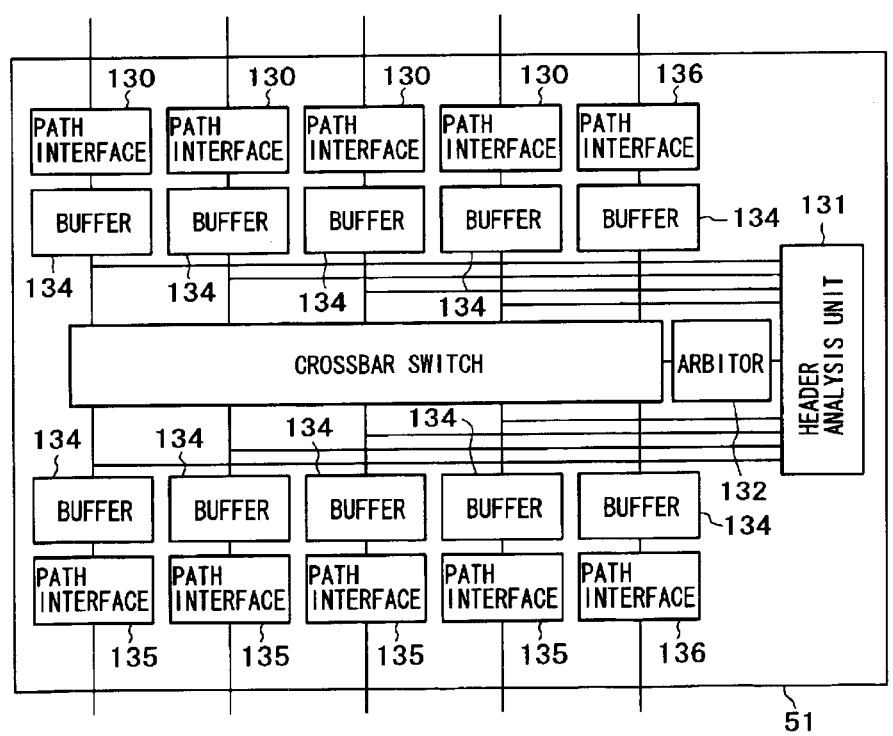
FIG. 22 is a block diagram of a switch unit included in the storage system of the present invention.

FIG. 22 shows a concrete example of the switch unit 51. The switch unit 51 includes at least four path IFs 130, a header analysis unit 131, an arbiter 132, a crossbar switch 133, four buffers 134, four path IFs 135, and two path IFs 136.

Each of the four path IFs 130 connects to a connection path connected to one of four protocol transformation units 10. Each of the four path IFs 135 connects to a connection path connected to one of four data caching control units 21. Each of the two path Ifs 136 connects to a connection path connected to one of two system management units 60. Each of the four buffers 134 buffers packets transferred between protocol transformation units 10, data caching control units 21 and the system management units 60.

The number of each system component described above is just an example; the number may be varied as needed.

FIG. 23 shows a format of packets to be transferred between protocol transformation units 10, data caching control units 21 and the system management units 60. A packet 200 is configured by a header 210, a payload 220, and an error check code 230. The header 210 stores at least the information for denoting both source and destination of the packet. The payload 220 stores a command, an address, data, and a status. And, the error check code is a code for detecting an error to occur in the packet during the transfer. If a packet is inputted to each of the path IFs 130, 135, and 136, the packet header 210 is transferred to the header analysis unit 131. The header analysis unit 131 then identifies the request of the connection between path IFs according to the packet destination information of the path IF, then transfers the request to the arbiter 132. The arbiter 132 performs arbitration according to the connection request from the path IF. Then, according to the arbitration result, the arbiter 132 outputs a signal for instructing the crossbar switch 133 to switch the connection over to the specified one. The crossbar switch 133 thus switches the internal connection over to the specified one. In this embodiment, each path IF is provided with a buffer 134. However, the four buffers 134 may be replaced with one larger buffer so that an area in the buffer is allocated to each path IF as a packet storage area. The header analysis unit 131 stores error information of the switch unit 51.

Figure 10:
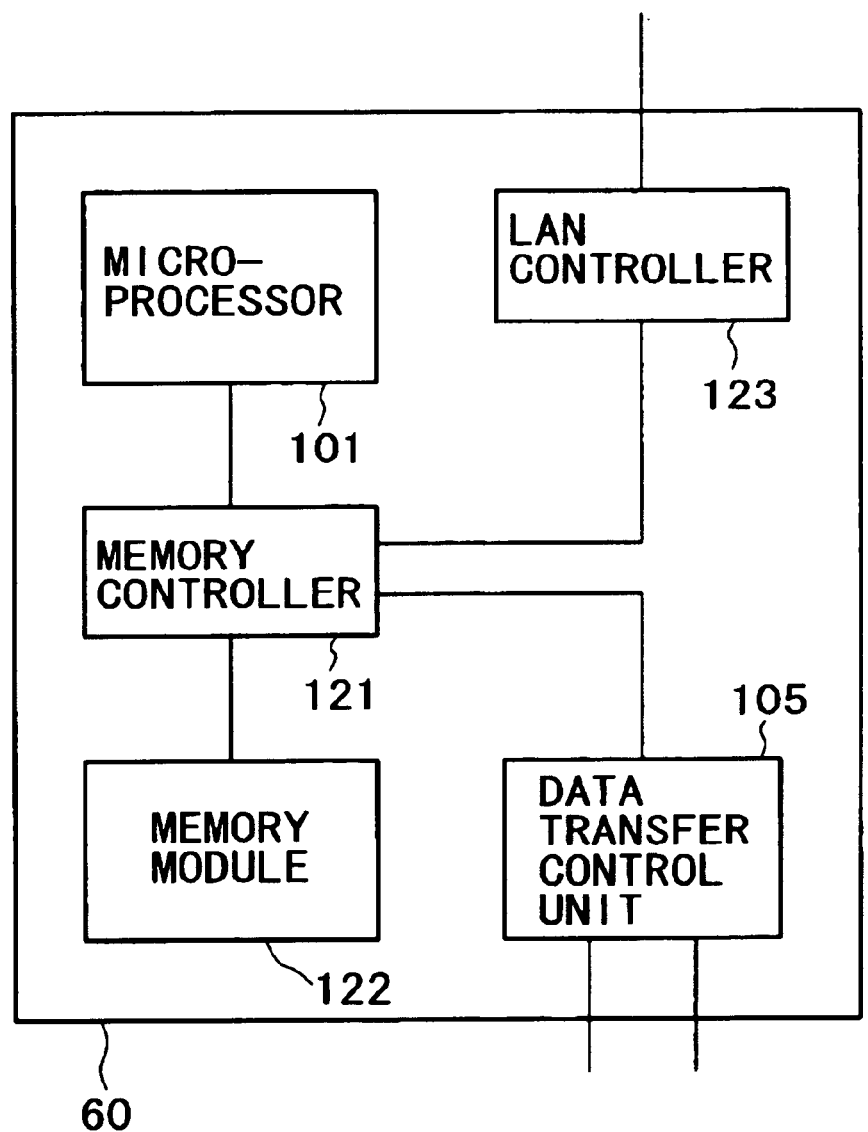
FIG. 10 is a block diagram of a system management unit included in the storage system of the present invention.

FIG. 10 shows a concrete example of the system management units 60. The system management units 60 includes at least a microprocessor 101, a transfer control unit 105 for controlling sending/receiving of data and control information to/from a target protocol transformation units 10 or data caching control unit 21, a memory controller 121, a memory module 122, and a LAN controller 123. The microprocessor 101 uses the memory module 122 as its main memory. The microprocessor 101 may also have a memory connected thereto and used as its main memory separately from the memory module 122.

The number of each component of the system management units 60 is just an example; the number may be varied freely. The microprocessor 101 is connected to the memory module 122, the data transfer control unit 105, and the LAN controller 123 through the memory controller 121. The microprocessor 101 collects the management information of the whole storage system 1 on the basis of the management information collected from the protocol transformation unit 10 and the data caching control unit 21, the management information of the interconnection 31, and the information set by the user from the management console connected to the LAN controller 123, then stores the collected management information in the memory module 122. The microprocessor 101 also manages the storage system 1 according to the management information. This management information is stored in a non-volatile memory (not shown) connected to the memory controller 121 or hard drives 2 to improve the reliability of the storage system 1.

The configuration of the connection among the microprocessor 101, the memory controller 121, the memory module 122, the LAN controller 123, and the data transfer control unit 105 is just an example; the configuration may be varied freely with no problem if the microprocessor 101 can control the memory controller 121, the memory module 122, the LAN controller 123, and the data transfer control unit 105.

As shown in FIG. 1, two data caching control unit 21 are combined into one control cluster 70, so that the management of the cache memory unit 111 is closed in the control cluster 70. In other words, the microprocessor 101 in a data caching control unit 21 in a control cluster 70 manages the cache memory unit 111 and the control memory unit 112 only in its own control cluster 70; it does not manage the cache memory unit 111 and the control memory unit 112 in any other control clusters 70.

The cache memory units 111 in the two data caching control units 21 and the control memory units 112 in the two data caching control units 21 may be duplicated respectively. If they are duplicated such way, it is possible to continue an operation discontinued by one of the two data caching control units 21 due to an error occurred there by the other data caching control unit 21, thereby the reliability of the storage system 1 is improved.

The number of each component of the data caching control unit 21 and the control clusters described above is just an example; the number may be varied freely.

If the same data is to be stored in the cache memory units 111 in a plurality of control clusters 70, a protocol transformation unit 10 that transfers the data to a data caching control unit 21 records the control information in an area predetermined in the memory located in the system management units 60. The control information denotes how the data is stored in the cache memory unit 111 in each control cluster 70. At the same time, the protocol transformation unit 10 sends the control information together with the data to the target data caching control unit 21. The data caching control unit 21 then, if the data stored in its own cache memory unit 111 multiply is to be renewed or deleted, sends the renewal/delete control information to the system management units 60. Receiving the renewal or delete control information, the system management units 60 renews or deletes the data stored multiply according to the control information that denotes the data stored multiply and whose cache memory units 111 in the target control cluster 70 the data is stored in, which store in the memory.

Because the cache memory units 111 to be controlled by the microprocessor 101 located in a data caching control unit 21 are limited only in one control cluster 70 as described above, the access load to the cache memory unit 111 and the control memory unit 112 can be reduced, thereby the performance of the storage system 1 is improved.

Figure 4:
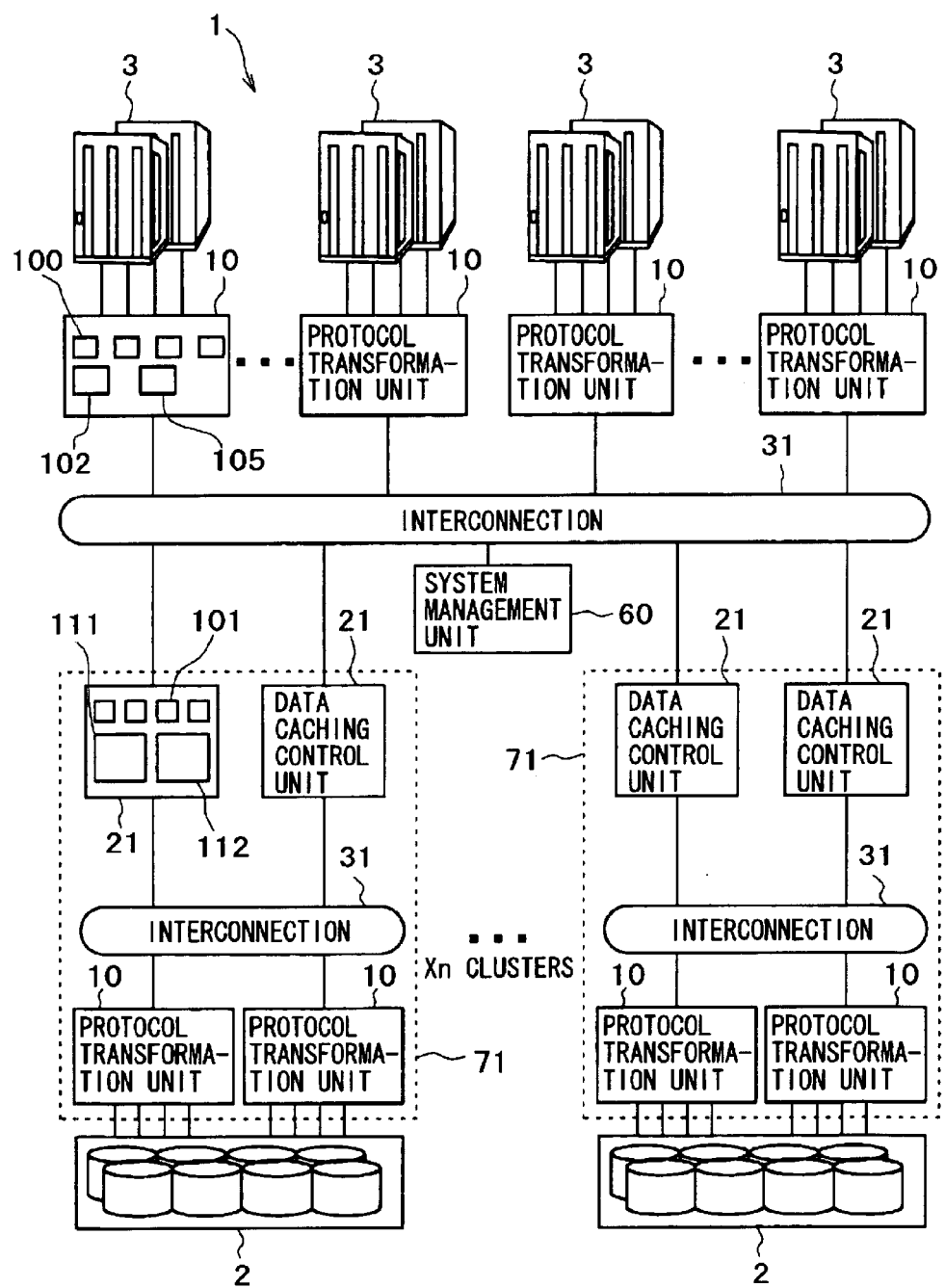
FIG. 4 is another logical block diagram of the storage system in the first embodiment of the present invention.

Furthermore, as shown in FIG. 4, the protocol transformation units 10 are classified into two types; those connected to the servers 3 and those connected to the hard drives 2 and two data caching control units 21 and the two protocol transformation units 10 connected to the hard drives 2 are combined into one control cluster 71 while the cache memory unit 111 located in a data caching control unit 21 of the self-control cluster 71 stores only data to be stored in the hard drives 2 connected to a protocol transformation unit 10 in the self-control cluster 71. At the same time, the management of the cache memory unit 111 is closed in the control cluster 71. In other words, the microprocessor 101 located in the data caching control unit 21 of a control cluster 71 manages only the cache memory unit 111 located in the self-control cluster 71 and does not manage the cache memory units 111 in any other control clusters 71.

In this case, while the interconnection 31 connected to the protocol transformation units 10 connected to the servers 3 is separated from that connected to the protocol transformation units 10 connected to the hard drives 2 in FIG. 4, both of the interconnections 31 are the same physically.

Here, the cache memory units 111 in the two data caching control units 21 and the control memory units 112 in the two data caching control units 21 may be duplicated respectively.

The number of each component in the storage system is just an example; the number may be varied freely. And because the cache memory units 111 to be controlled by a microprocessor 101 in the data caching control unit 21 are limited only in one control cluster 71 as described above, it is possible to reduce the load of accesses to the cache memory units 111 and the control memory units 112. As a result, the performance of the storage system 1 is improved.

Furthermore, because data is not stored so much in the cache memory units 111 in a plurality of control clusters 71 in the configuration shown in FIG. 4, it is possible to omit the coincidence control (which is needed in the configuration shown in FIG. 1) of the data stored multiply in the cache memory units 111 in the plurality of control cluster 71 in the system management units 60. The system management is thus simplified. The performance of the storage system 1 is also improved more than that in the configuration shown in FIG. 1.

Next, a management configuration of the entire storage system 1 will be described with reference to FIG. 11. In prior to the description, the management configuration of the storage system 1 shown in FIG. 4 will be described here.

The system management units 60 simplifies its management of the storage system 1 by dividing the management of the storage system 1 into three management layers, that is, the network management unit 503, the logical path management unit 502, and the storage management unit 501.

The network mentioned here means the interconnection 31. The network management unit 503 performs at least the network control 541 and the network error recover process 542. For example, in the interconnection configured by the switch units 51 shown in FIG. 6, sets of physical links amongst the protocol transformation units 10, the switch units 51, the data caching control units 21, and the system management units 60, migration of the links, and detects and recover process of physical errors are performed by the network management unit 503.

The logical path management unit 502 performs at least the logical path allocation 531 and the logical path blockade/switching process 532. The logical path mentioned here means a logical path set among each protocol transformation unit 10, each data caching control unit 21, and each system management units 60. For example, in the configuration shown in FIG. 6, a path from one protocol transformation unit 10 to one data caching control unit 21 through one switch unit 51 is assumed as one logical path. Consequently, two logical paths come to be set between one protocol transformation unit 10 and one data caching control unit 21. Similarly, two logical paths are set between each protocol transformation unit 10 and the system management units 60, between the system management units 60 and each data caching control unit 21, between the protocol transformation units 10, between the data caching control units 21, and between the system management units 60. The logical path management unit 502 sets the above described logical paths at the time of system start-up, blockades one of the two logical path between the above devices when an error occurs in the logical path, and switches over to the other logical path.

The storage management unit 501 then performs at least the volume integration management 521, the server—LU (logical unit) assignment 522, and the system error recover process 523. The volume management process 521 manages logical volumes by integrating each logical volume managed in each control cluster 71. An LU is selected from the integrated logical volume in the server—LU assignment process 522 so that it is allocated to each server 3. The volume management 521 and the server—LU assignment 522 make it possible to make the plurality of control clusters 71, each of which is controlled independently, look like one storage system 1 from the server 3.

In this embodiment, it is also possible to connect an additional storage systems to a protocol transformation unit 10 connected to a server 3. In this case, the volume management process 521 also makes it possible to manage the LUs of the additional storage system and those LUs are allocated to the server 3 in the server—LU allocation process 522. Consequently, the server 3 can access the volumes of the additional storage system 4 through the storage system 1.

Furthermore, the storage management unit 501 can manage a table for denoting the connection between each protocol transformation unit 10 and each server 3 to enable the communication among a plurality of servers 3 connected to the storage system 1. When data is transferred between the servers 3 connected to the protocol transformation units 10 and the storage systems 4, the data transfer is done between target protocol transformation units 10 through the interconnection 31. At this time, the data may be cached in the memory of the system management units 60 or in the cache memory unit 21 located in the target data caching control unit 21. The data transfer performance between the servers 3 and the storage systems 4 is thus improved.

Figure 27:
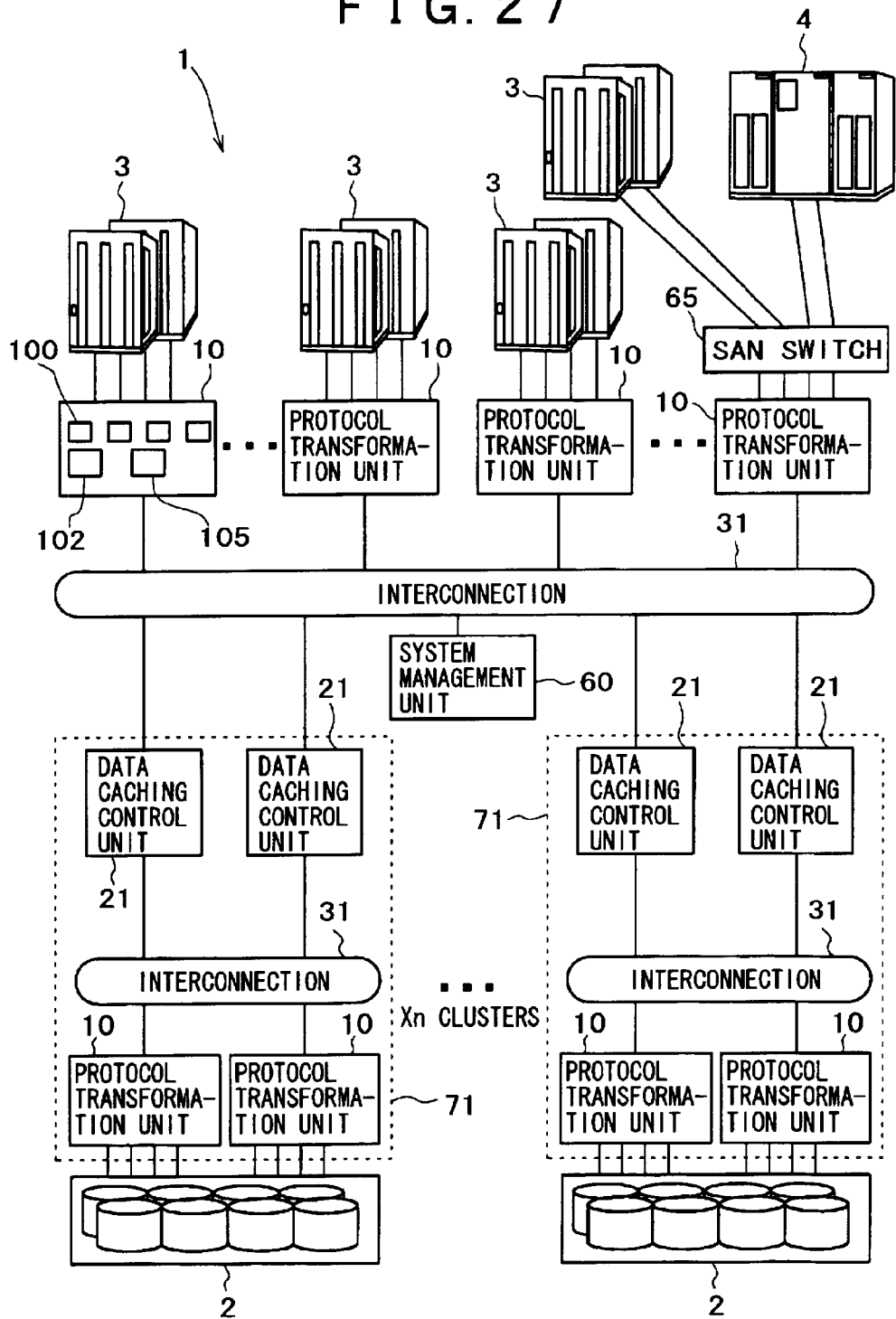
FIG. 27 is another block diagram for describing how the external equipment is connected to the protocol transformation unit in the storage system of the present invention.

Furthermore, in this embodiment, as shown in FIG. 27, the storage system 1, the server 3, and another storage system 4 are connected to each another through a SAN switch 65. And, the external IF 100 located in each protocol transformation unit 10 is provided with a function for accessing the server 3 and another storage system 4 through the SAN switch 65. As a result, the server 3 connected to the storage system is enabled to access another server 3 and another storage system 4 connected to the SAN switch 65 and a network configured by a plurality of SAN switches 65.

The system error recovery process 523 collects error information from each of the protocol transformation units 10 and the data caching control units 21, as well as logical path error information from the logical path management unit 502 so as to decide a storage system portion to be blockaded or replaced. The process 523 also sends control information used to execute a blockade processing to the target device (the protocol transformation unit 10, the data caching control unit 21, or the switch unit 51) to blockade the target portion therein. After the completion of the blockade processing, a message for prompting the user to replace the error portion is displayed on the monitor of the management console. When the user inputs a message of the completion of the error occurred portion replacement, the blockade cancel control information is sent to the target portion, thereby the target portion is canceled from the blockade. After the completion of the blockade cancellation, the storage system is restored to the normal operation.

The management of the whole storage system 1 divided in three management layers in the system management units 60 as described above is thus ended.

The network management unit 503 and the logical path management unit 502 can also be combined into one management unit for system controlling.

Figure 2:
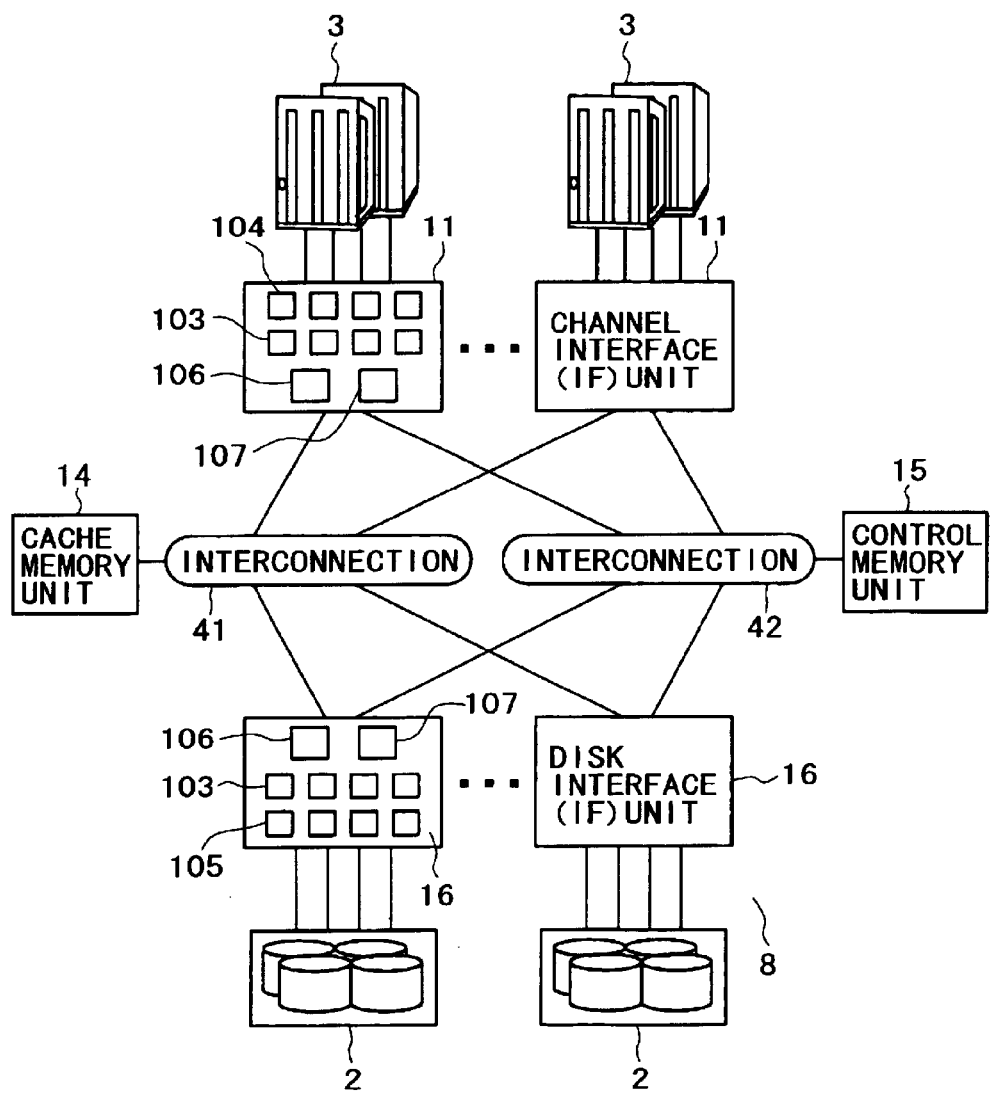
FIG. 2 is a block diagram of a conventional storage system.

As described above, according to the present invention, such the processings as sending and receiving commands/data to/from the server 3, command analysis, and distribution of requests received from the server 3, which are performed in the channel IF unit 11, as well as such the processings as sending and receiving commands/data to/from the hard drives 2, command analysis, and distribution of requests to the hard drives, which are performed in the disk IF unit 16 according to the conventional technique shown in FIG. 2 respectively are all executed in the protocol transformation units 10 and other processings performed in the channel IF units 11 and the disk IF units 16 are processed in the data caching control units 21.

Consequently, each data caching control unit 21 performs at least processings of cache control 561, data transfer control 562, and volume management 563 only in a target control cluster. The cache control process 561 includes controlling of reading/writing of data from/to the cache memory unit 111, management of directories for the cache memory unit 111 stored in the control memory unit 112, and judgment process for cache hit or cache miss to check if requested data exists in the cache memory unit 111. The data transfer control process 562 includes controlling of data transfer between each protocol transformation unit 10 and the cache memory unit 111. The volume management 563 in a control cluster includes configuration of a logical volume in a control cluster from a physical volume of the hard drives 2 and management of a table for the logical volume configuration. The protocol transformation units 10 are classified into two types; server connected units 504, which belong to a group of the protocol transformation units 10 connected to the servers 3 and a device connected units 506, which belong to a group of the protocol transformation units 10 connected to the hard drives 2.

Each protocol transformation unit 10, which is in a server connection unit 504 performs at least the command processing 551 and the request distribution 552. The command processing 551 sends/receives commands to/from the server 3, analyzes commands received from the server 3, and issues commands to the server 3. In the request distribution 552, data read/write command/data received from the server 3 is transformed to an internal protocol used in the system and transferred to the target data caching control unit 21 or protocol transformation unit 10. In addition, the request distribution process 552 transforms the internal protocols transformed from the commands/data received from the data caching control units 21 or protocol transformation units 10 to protocols used between the server 3 and the protocol transformation units 10, then transferred to the server 3.

Each protocol transformation unit 10, which is in a device connected unit 506 performs at least the command processing 571, the request distribution 572, the device control 593, and the device error recovery process 594.

In this embodiment, the device mentioned here means the hard drives 2. However, any device will do if it can record block type data. For example, the device may be an optical disk.

In the command processing 571, each protocol transformation unit 10 sends/receives commands to/from the device, issues commands to the device, and analyzes replies received from the device. In the request distribution process 572, the protocol transformation unit 10 converts the read/write command/data issued to a target device from an internal protocol to a protocol used between the device and the target protocol transformation unit 10, then transfers the result to the target device. The protocol transformation unit 10 then transfers replies and data received from the device to the target data caching control unit 21 or protocol transformation unit 10. In addition, in the device control process 573, the protocol transformation unit 10 controls the read/write operation from/to the device. In the device error recovery process 574, the protocol transformation unit 10 performs blockade/replacement of a device when an error occurs in the device.

As described above, according to the present invention, processings performed by the channel IF units 11 and the disk IF units 16 separately according to the conventional technique are all performed in the data caching control units 21, so that the communication between the channel IF units 11 and the disk IF units 16 through the control memory unit 15 is omitted. The performance of the storage system 1 can thus be improved.

While a description has been made for the management configuration in the storage system 1 configured as shown in FIG. 4, the storage system configuration shown in FIG. 1 also makes it possible to do the management similarly if a data coincidence control process is added to the system management units 60 so that the data coincidence control process is done for the data stored multiply in the cache memory units located in a plurality of control clusters.

Next, a description will be made for a relationship between physical volumes and logical volumes, a relationship between logical volumes and logical units, and allocation of logical volumes to servers with reference to FIGS. 12 through 15. Hereinafter, logical volumes will be referred to as virtual volumes.

FIG. 12 shows a management table 651 for physical devices. In other words, the table 651 shows a relationship between physical devices (hard drives 2 in this embodiment) and virtual volumes, each of which is a collection of physical devices. Each physical device number (PDEV#) 630 corresponds to one hard disk. One virtual volume 1 is configured by four physical devices and a unique virtual volume number 631 is assigned to each virtual volume in each control cluster 71. In addition, a RAID class 605 denoting the RAID configuration of a virtual volume 1 and a volume capacity 601 denoting the capacity of the virtual volume 1 are added to the virtual volume 1. And, a connection adapter number 610 denoting a subject protocol transformation adapter (PA) 10 that manages the volume is assigned to the virtual volume in the control cluster 71. The virtual volume 2 number 632 is a unique number decided in the whole storage system 1. The number 632 is assigned by the system management units 60 to manage all the virtual volumes in a plurality of control clusters 71 integrally.

The number of each system component described above is just an example; the number may be varied freely. The items other than the virtual volume 2 number in the physical device management table 651 are generated in the data caching control units 21 in each control cluster 71 at the initial system setup time and registered in the system management units 60. The system management units 60 then generates a table (physical device management table 651) in which virtual volume 2 numbers 632 are assigned, on the basis of the tables in all the control clusters 71. Then, a copy of the portion related to each control cluster 71 is transferred from the table to the target data caching control unit 21 in the subject control cluster 71 and the data caching control unit 21 stores the copy in the control memory unit 112.

If the configuration of the hard drives 2 is changed, the data caching control unit 21 that manages the hard drives 2 renews the items other than the virtual volume 2 number in the physical device management table 651 and registers the renewed items in the system management units 60. The system management units 60 then renews the physical device management table 651 according to the registered items and transfers a copy of the portions related to each control cluster 71 from the physical device management table 651 to the target data caching control unit 21 in target control cluster 71. Each data caching control unit 21 then stores the copy in the corresponding control memory unit 112.

All the information items required to generate a physical device management table 651 may be transferred to the system management units 60 from each data caching control unit 21 so that the system management units 60 generates all the items in the physical device management table 651 according to the information items.

FIG. 13 shows a virtual volume management table 652. Because a virtual volume 1 (virtual volume 2) is configured by a plurality of hard disks, the capacity becomes as large as several hundreds of gigabytes. This is why the virtual volume 1 (virtual volume 2) is divided in a plurality of smaller capacity virtual volumes 3 to facilitate the user to control the volume 1 (volume 2). This virtual volume management table 652 denotes a relationship between each virtual volume 3 number 633 and an address range 641 in the virtual volume 1. This virtual volume management table 652 also denotes each management data caching control unit numbers 621 that denotes a target data caching control unit 21 that manages a target virtual volume 1.

If the hard disk capacity is as small as several gigabytes or if the user required logical unit capacity becomes as large as several hundreds of gigabytes, there is no need to generate such the virtual volume 3.

The system management units 60 generates the virtual volume management table 652 on the basis of the information of the virtual logical volume 1 transferred from each data caching control unit 21.

FIG. 14 shows a logical unit management table 653. This table 653 denotes a relationship between each virtual volume 3 and a logical unit supplied to the user actually. A logical unit is configured by one or a plurality of virtual volumes 3. The logical unit management table 653 denotes each logical unit 661 and virtual volume 3 number(s) 633 configuring the logical unit 661. A logical unit number 661 is a unique number decided in the whole storage system 1. The table 653 also denotes a RAID class 605 of each virtual logical volume 1 to which the subject logical unit belongs in order to denote the reliability of the logical unit. Furthermore, the table 653 denotes a management data caching unit number 621 denoting a target data-caching control unit 21 that manages the virtual volume(s) 2 of the subject logical unit. The logical unit may be configured by a plurality of virtual volumes 3 having different management data caching control units. In such a case, accesses to one logical unit are distributed in a plurality of data caching control units 21, so that the load of the data caching control units 21 is dispersed, thereby the performance of the storage system 1 is improved.

FIG. 15 shows a logical unit allocation management table 654. This table 654 denotes a relationship between each connected server number 670 and a logical unit allocated to the server. If a plurality of logical units are allocated to a server, the logical unit numbers assigned to the server must begin at 0. Consequently, logical units allocated to the server come to have virtual logical unit numbers 662 beginning at 0. The logical unit allocation management table 654 also denotes a relationship between this virtual logical unit number 662 and the logical unit number 661, as well as between a connection adapter number 611 and a connection channel number 615. The table 654 also denotes the connection adapter number 611 and the connection channel number that denote a connection channel of a protocol transformation unit (PA), to which the subject server is connected. In addition, the table 654 also denotes the management data caching unit number 621 for denoting a data caching control unit 21 that manages each target virtual volumes configuring a target logical unit. This management data caching unit number 621 is needed to know a target data caching control unit 21 to which a protocol transformation unit 10 connected to a server should access in response to an access request received from the server without inquiring it to the system management units 60. The management data caching unit number 621 can thus make it quicken to response to the access request from a host.

In this connection, the logical unit allocation management table 654 is generated/managed by the system management units 60 according to the information received from each protocol transformation unit 10 connected to the server and the information set by the user from the management console. And, the system management units 60 transfers a copy of the portion related to each protocol transformation unit 10 in the table 654 to the target protocol transformation unit 10 and the protocol transformation unit 10 stores the copied data in the memory (not shown) connected to the microprocessor 102.

If the server connection configuration/logical unit allocation changes, the system management units 60 renews the logical unit allocation management table 654 and transfers the portion related to each protocol transformation unit 10 in the table to the target protocol transformation unit 10. The transformation unit 10 then stores the copied data in the corresponding memory (not shown) connected to the microprocessor 102.

Part or whole of the tables shown in FIGS. 12 through 15 are displayed on the monitor of the management console so that the user can set some or all of the relationships among logical units, virtual volumes, and physical devices from the management console.

In this embodiment, a plurality of types of volumes are configured by physical devices, logical volumes, and logical units supplied to the user. However, the configuration is just an example; it may be varied freely. What are actually needed are functions supplied to configure/manage each volume independently in each control cluster 71, as well as functions for enabling the system management units 60 to manage volumes supplied by all the control clusters 71 in the storage system 1 integrally, isolate a target volume from among them to supply it to the user. Those functions are indispensable to realize the present invention.

Figure 16:
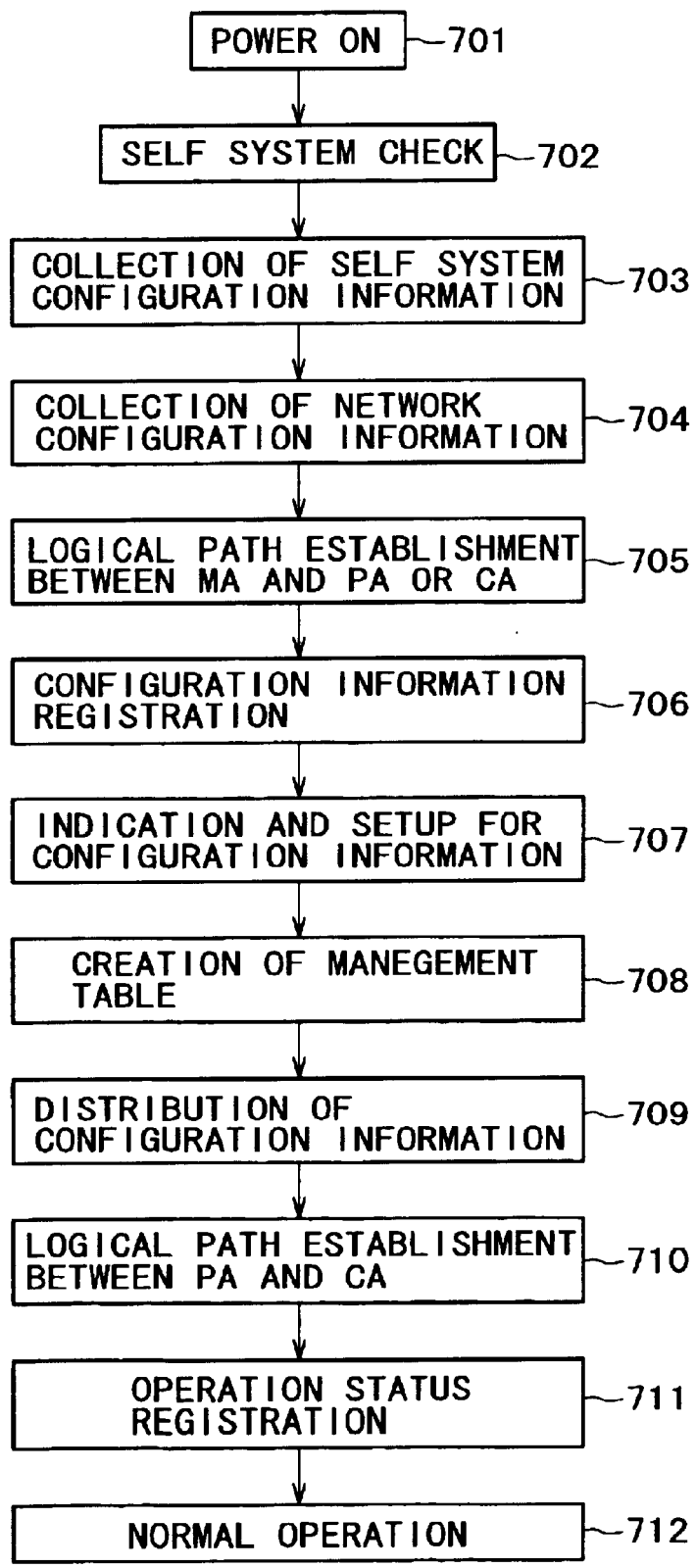
FIG. 16 is a flowchart of the initial setup of the storage system of the present invention at the system startup time.

Next, a description in FIG. 16 will be made for an operation flowchart of the storage system 1 at the initial system setup time. When the power supply is turned on (step 701), each of the protocol transformation units 10, the data caching control units 21, and the system management units 60 makes a self-system check (step 702). In the self-system check (step 702), each system component make a self-diagnosis for normal/abnormal (error occurrence) operation. If an error occurs in itself, the component notifies the system management units 60 of the error in the configuration information registration process (step 706) to be described later. If the error cannot be notified to the system management units 60, the component activates the display function for denoting the error detected in itself. If it is decided in the self-system check (step 702) that the operation is normal, the component collects the self-configuration information items (ID number, processor number, processor type/ specifications, memory capacity, etc.)(collection of self-configuration information (step 703)). At this time, the subject protocol transformation unit 10 connected to the hard drives 2 checks the configuration of the hard drives connected thereto and checks each hard disk for errors. If an error is detected in a hard disk, the protocol transformation unit 10 notifies the system management units 60 of the error in the configuration information registration process (step 706). The network management unit 503 Located in the system management units 60 then collects the physical link information of the interconnection 31 to check the configuration (collection of network configuration information (step 704)). Both of the protocol transformation unit (PA) 10 and the data caching control unit (CA) 21, after the collection of the self information (step 703), waits for a predetermined time required by the system management units 60(MA) to collect the network configuration information (step 704), then establishes a logical path to the system management units 60 (MA-PA/MA-CA logical path establishment (step 705)). After this, each of the protocol transformation unit 10 and the data caching control unit 21 registers the self-configuration information collected by itself in the system management units 60(configuration information registration (step 706)). At this time, each of the protocol transformation unit 10 and the data caching control unit 21 also sends the error information to the system management units 60 as described above. Then, some or all the configuration information management tables shown in FIGS. 12 through 15 (each relationship between numbers are not decided yet, so that some fields that must be set by the user are empty) are displayed on the monitor of the management console connected to the system management units 60, then the user is requested to set some or all the relationships among physical devices, virtual volumes, and logical units on the management console (configuration information display/setup (step 707)). At this time, every relationship between numbers is not decided yet in the management tables. Some fields that must be decided by the user are empty so that the user can input the necessary data in them. Then, the management tables shown in FIGS. 12 through 15 are filled with data including those set by the user, then stored in the corresponding memory located in the system management units 60(management table creation (step 708)). The tables are stored in both or one of a non-volatile memory located in the system management units 60 and a hard disk in the hard drives 2 to avoid system down to be caused by error occurrence. The system management units 60 then distributes a copy of the portion related to each of the protocol transformation units 10 and each of the data caching control unit 21 in the management tables to each of the protocol transformation units 10 and each of the data caching control unit 21 so as to be stored in the self memory (configuration information distribution (step 709)). Each protocol transformation unit 10 then refers to the management table related to itself, distributed from the system management units 60, to check a data caching control unit 21 that must be accessed by itself and establishes a logical path to the target data caching control unit 21 (PA-CA logical path establishment (step 710)). Finally, each of the protocol transformation unit 10 and the data caching control unit 21 decides whether or not every initial setup is ended normally and notifies the system management units 60 of the result. The system management units 60 then confirms the notice for the normal end of the initial setup in each of the protocol transformation unit 10 and the data caching control unit 21, as well as the normal end of the self initial setup (operation status registration (step 711)). After the confirmation of the normal end of every initial setup, the system management units 60 begins a normal read/write operation (normal operation (step 712)).

Figure 17:
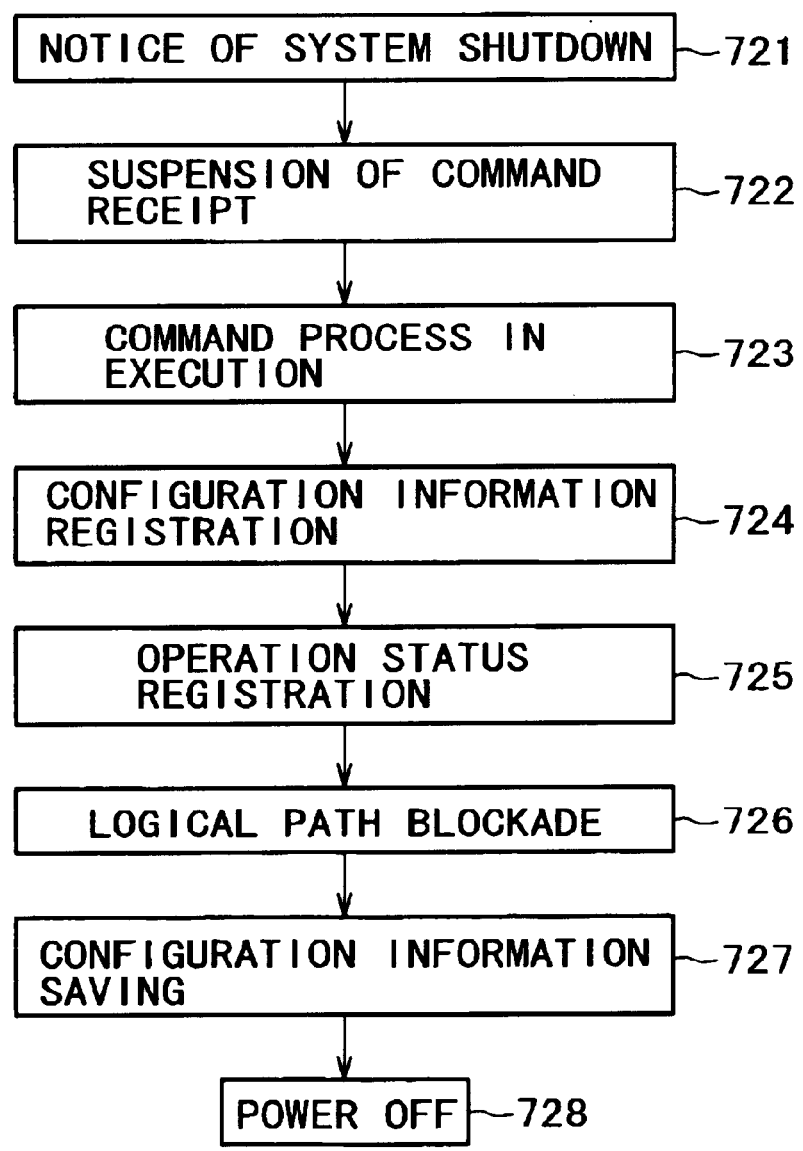
FIG. 17 is a flowchart of the shut-down of the storage system of the present invention.

Next, a description in FIG. 17 will be made for an operation flowchart of the storage system 1 at the system shut-down time. At first, the user issues a notice for system shut-down 721 to the system management units 60 from the management console. In response, the system management units 60 issues control information for instructing the target protocol information unit 10 and the target data caching control unit 21 to suspend the command receiving. Receiving the control information, each of the protocol transformation unit 10 and the data caching control unit 21 suspends receiving of commands (command receiving suspension (step 722)). After this, each of the protocol transformation unit 10 and the data caching control unit 21 processes all the commands accepted already (process for commands in execution (step 723)). Then, each of the protocol transformation unit 10 and the data caching control unit 21 collects self-configuration information just like at the initial system setup time to register the information in the system management units 60 (configuration information registration (step 724)). Each of the protocol transformation unit 10 and the data caching control unit 21 then registers its possibility to terminate the operation in the system management units 60 (operation status registration (step 725)). The protocol transformation unit 10 then blockades the logical path to the data caching control unit 21. Each of the protocol transformation unit 10 and the data caching control unit 21 then blockades the logical path to the system management units 60 (logical path blockade (step 726)). Finally, the system management units 60 stores the configuration information registered from both of the protocol transformation unit 10 and the data caching control unit 21, as well as the configuration information of itself in the non-volatile memory (configuration information storage (step 727)). After this, "system shut-down process completion, power OFF enabled" is displayed on the monitor of the management console. The user thus turns off the power supply.

Figure 18:
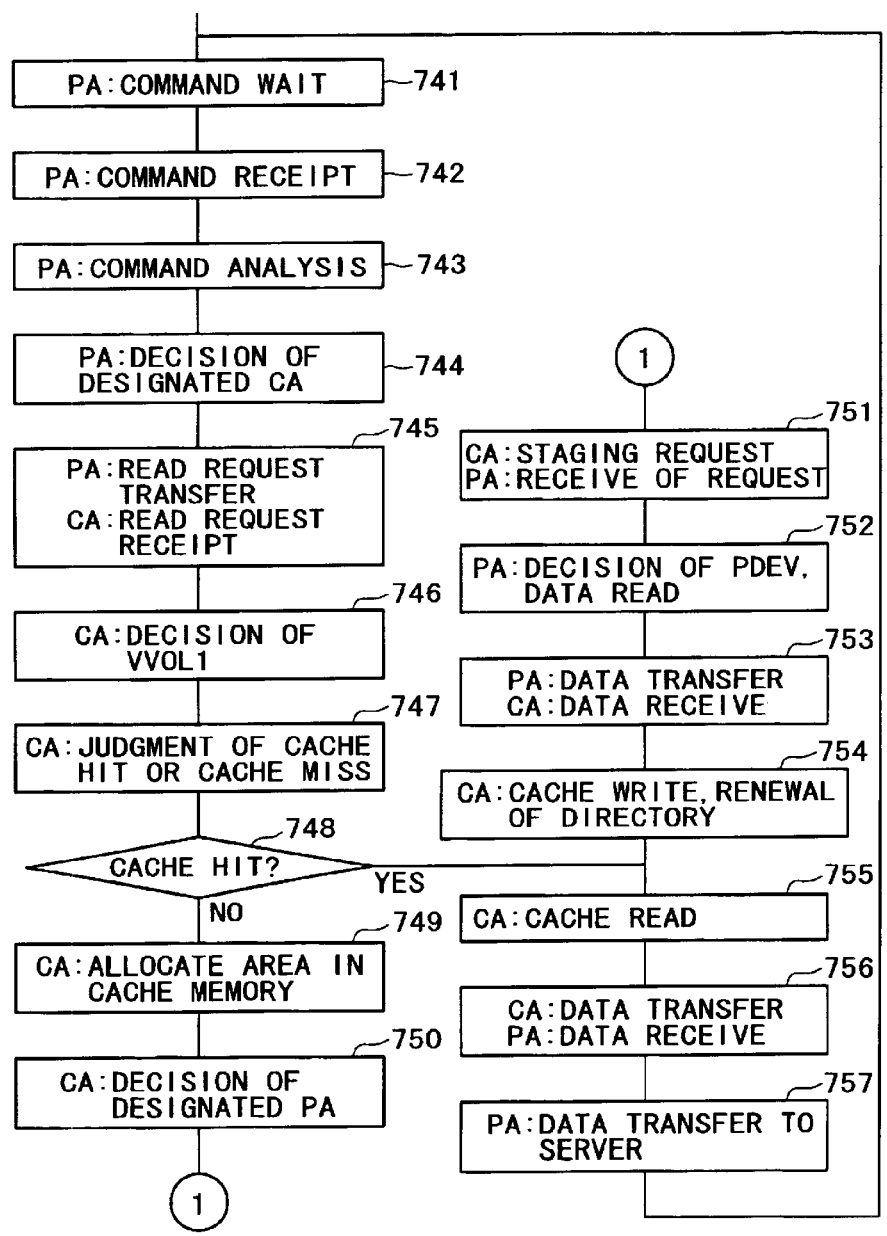
FIG. 18 is a flowchart of a read operation of the storage system of the present invention.

Next, a description in FIG. 18 will be made for how a server 3 reads data from the storage system 1. At first, the server 3 issues a read command to the storage system 1. Then, an external IF 100 located in the target protocol transformation unit (PA) 10 receives the command. The microprocessor 102 that has waited for a command then reads the command from the external IF 100 (command receiving step 742) and analyzes the command (step 743). The microprocessor 102 identifies the target logical unit (LU) that stores the data requested from the server 3 through this command analysis. The microprocessor 102 thus refers to the logical unit allocation management table 654 related to the self protocol transformation unit 10, distributed from the system management units 60 at the time of initial system setup/change to identify the data caching control unit (CA) 21 that manages the virtual volume included in the LU that stores the requested data (step 744). After this, the microprocessor 102 issues a read request to the data transfer control unit 105 of the target data caching control unit 21 via the data transfer control unit 105 through an interconnection (step 745). Receiving the read request, the microprocessor 101 located in the data caching control unit 21 that has received the read request accesses the control memory unit 112 to refer to the logical unit management table 653, the virtual volume management table 652, and the physical device management table 651 to identify the address 641 in the virtual volume 1 (step 746). The microprocessor 101 then accesses the control memory unit 112 to decide whether or not the requested data exists in the self-cache memory unit 111 according to the virtual volume 1 number 631 and the address 641 in the virtual volume 1 (step 747).

If the requested data exists in the self-cache memory unit 111 (cache hit), the microprocessor 101 instructs the data-transfer control unit 105 to transfer the requested data to the protocol transformation unit 10 that has issued the request from the cache memory unit 111 (step 755). The data transfer control unit 105 thus transfers the requested data to the data transfer control unit 105 of the protocol transformation unit 10 that has issued the request through the interconnection 31 (step 756). Receiving the requested data, the data transfer control unit 105 of the protocol transformation unit 10 sends the data to the server 3 through the external IF 100 (step 757).

If the requested data does not exist in the self-cache memory unit 111 (cache miss), the microprocessor 101 allocates an area in the cache memory unit 111 so as to store the requested data therein (step 749). After this, the microprocessor 101 accesses the control memory unit 112 to refer to the physical device management table 651 and identifies the connection adapter number 610 (the number of the protocol transformation unit (PA) 10 connected to the target physical device (hard disk)) that manages the physical device (PDEV) included in the requested virtual volume 1 (step 750). The microprocessor 101 then sends control information that instructs the data transfer control unit 105 of the target protocol transformation unit 10 to read the requested data and transfer the data to the target data caching control unit 21 through the data transfer control unit 105 (step 751). The microprocessor 102 of the protocol transformation unit 10 thus receives the control information from the data transfer control unit 105 and refers to the copy of the physical device management table 651 related itself, distributed from the system management units 60 at the time of initial system setup/change time to decide the physical device (PDEV: hard disk) from which data is to be read, then reads the data from the target hard disk (step 752). The microprocessor 101 transfers the data to the data transfer control unit 105 of the data caching control unit 21 through the interconnection 31 (step 753). The microprocessor 101 of the data caching control unit 21 that has issued the request, when the data transfer control unit 105 receives the requested data, writes the data in the cache memory unit 111 and renews the cache memory directory stored in the control memory unit 112 (step 754). Hereinafter, the operation flow is similar to that in and after step 755 at the time of a cache hit. Thus, the requested data is read from the hard disk in response to the read request issued from the server 3 and sent to the server 3.

Figure 19:
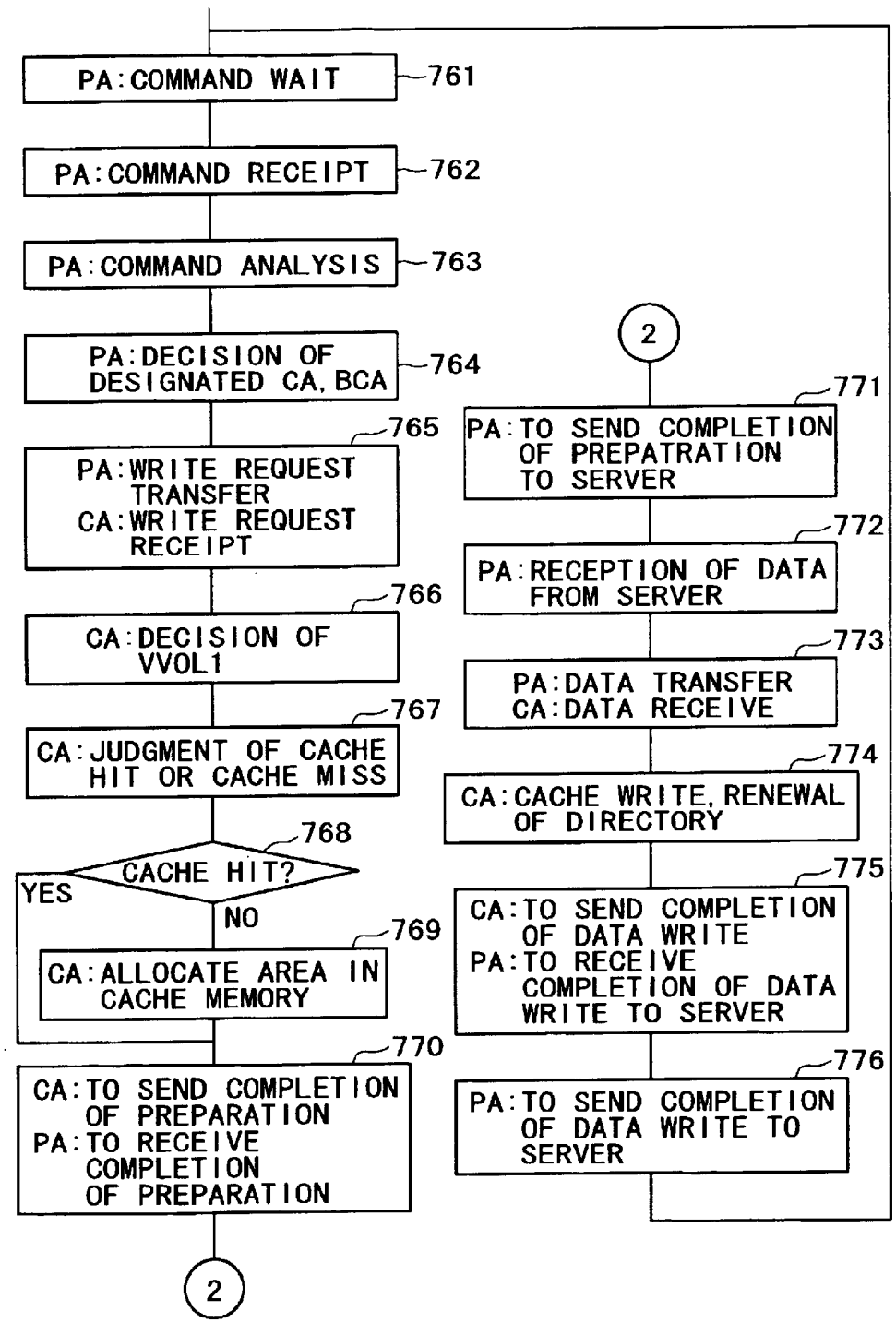
FIG. 19 is a flowchart of a write operation of the storage system of the present invention.

Next, a description in FIG. 19 will be made for how the server 3 writes data in the storage system 1. At first, the server 3 issues a data write command to the storage system 1.

When an external IF 100 of the target protocol transformation unit (PA) 10 receives the command, the microprocessor 102 that has waited for a command (step 761) reads the command from the external IF 100 (command receiving step 762) and analyzes the command (step 763). The microprocessor 102 identifies the logical unit (LU) that stores the requested data requested from the server 3 through this command analysis. The microprocessor 102 thus refers to the logical unit allocation management table 654 related to the self-protocol transformation unit 10, distributed from the system management units 60 at the time of initial system setup/change to identify the data caching control unit (CA) 21 that manages the virtual volume included in the LU that stores the requested data (step 764).

If the data caching control unit 21 that manages virtual volumes is duplicated at this time, the reliability of the storage system 1 will be more improved. In other words, a master data caching control unit 21 for managing each virtual volume independently and a backup data caching control unit (BCA) 21 are decided for each virtual volume so that data is written in both of the control units 21 beforehand. Consequently, when an error occurs in the master data caching control unit 21, the backup data caching control unit 21 can continue the operation. In the processing in step 764, the number of the backup data caching control unit 21 is also identified, since the logical unit allocation management table 654 records the backup data caching control unit 21. Hereinafter, a description will be made for a case in which the backup data caching control unit 21 is also decided.

The microprocessor 102 instructs the data transfer control unit 105 to issue a data write request to the data transfer control units 105 of both the target data caching control unit 21 and the backup data caching control unit 21 through the interconnection 31 (step 765). Each of the microprocessors 101 located in the data caching control unit 21 that has received the write request and the backup data caching control unit 21 accesses its corresponding control memory unit 112 to refer to the logical unit management table 653, the virtual volume management table 652, and the physical device management table 651 to identify the target virtual volume 1 number 631 and the address 641 in the virtual volume 1 (step 766) respectively. The microprocessor 101 then accesses the control memory unit 112 to decide whether or not the requested data exists in the self-cache memory unit 111 according to the virtual volume 1 number 631 and the address 641 in the virtual volume 1 (step 767).

If the requested data exists in the self-cache memory unit 111 (cache hit), the microprocessor 101 sends a notice of completion of preparation for data write to the protocol transformation unit 10 that has issued the request through the data transfer control unit 105 (step 770). If the requested data does not exist in the self-cache memory unit 111 (cache miss), the microprocessor 101 allocates an area in the cache memory unit 111 so as to store the requested data therein (step 769), then sends a notice of completion of preparation for data write to the protocol transformation unit 10 (step 770).

Receiving the notice, the microprocessor 102 of the protocol transformation unit 10 sends the notice of completion of preparation for data write to the server 3 through the external IF 100. After this, the microprocessor 101 receives the data from the server through the external IF 100 (step 772). The microprocessor 102 then instructs the data transfer control unit 105 to send the data to the transfer control units 105 of the target data caching control unit 21 and the backup data caching control unit 21 respectively (step 773). Each of the microprocessors 101 of the data caching control unit 21 and the backup-data caching control unit 21 that have received the data writes the data in the self-cache memory unit 111 to renew the directory of the cache memory stored in the control memory unit 112 (step 774). After the writing in the cache memory unit 111 ends, each of the microprocessors 101 of the data caching control unit 21 and the backup data caching control unit 21 sends a notice of completion of data write to the resource source protocol transformation unit 10 through the data transfer control unit 105 (step 775). The microprocessor 101 of the protocol transformation unit 10, which has received the notice then sends the notice of completion of data write to the server 3 through the external IF 100. The microprocessor 101 of the master data caching control unit 21 then decides the vacant capacity, etc., of the target cache memory unit 111. The microprocessor 101 then writes the data in the cache memory unit 111 in a hard disk that includes the data recording volume. The data is written through the protocol transformation unit 10 connected to the hard disk. The data is written asynchronously with the write request issued from the server 3. Thus, the write operation that has begun in response to a write request from the server 3 is completed.

According to this embodiment in which cache memories are controlled only in a target control cluster independently of other clusters, therefore, the load of accesses to the cache memory unit and the control memory unit is reduced. In addition, a microprocessor located in each cache memory control unit controls cache memories and the data transfer between the server and each hard disk collectively, the communication processing between processors, required in the conventional storage system shown in FIG. 2, is reduced. Consequently, the performance of the entire storage system 1 is improved.

Furthermore, because cache memories are controlled in each control cluster independently, it is possible to integrate the cache memories in each control cluster so as to be operated as a storage system. Consequently, the system cost can be minimized for each control cluster, thereby it is possible to provide low price small scale storage systems, as well as reasonable price storage systems in accordance with required scales.

It is thus possible to provide storage systems at reasonable prices/performance in correspondence with large to small configurations appropriately to various system scales.

Figure 7:
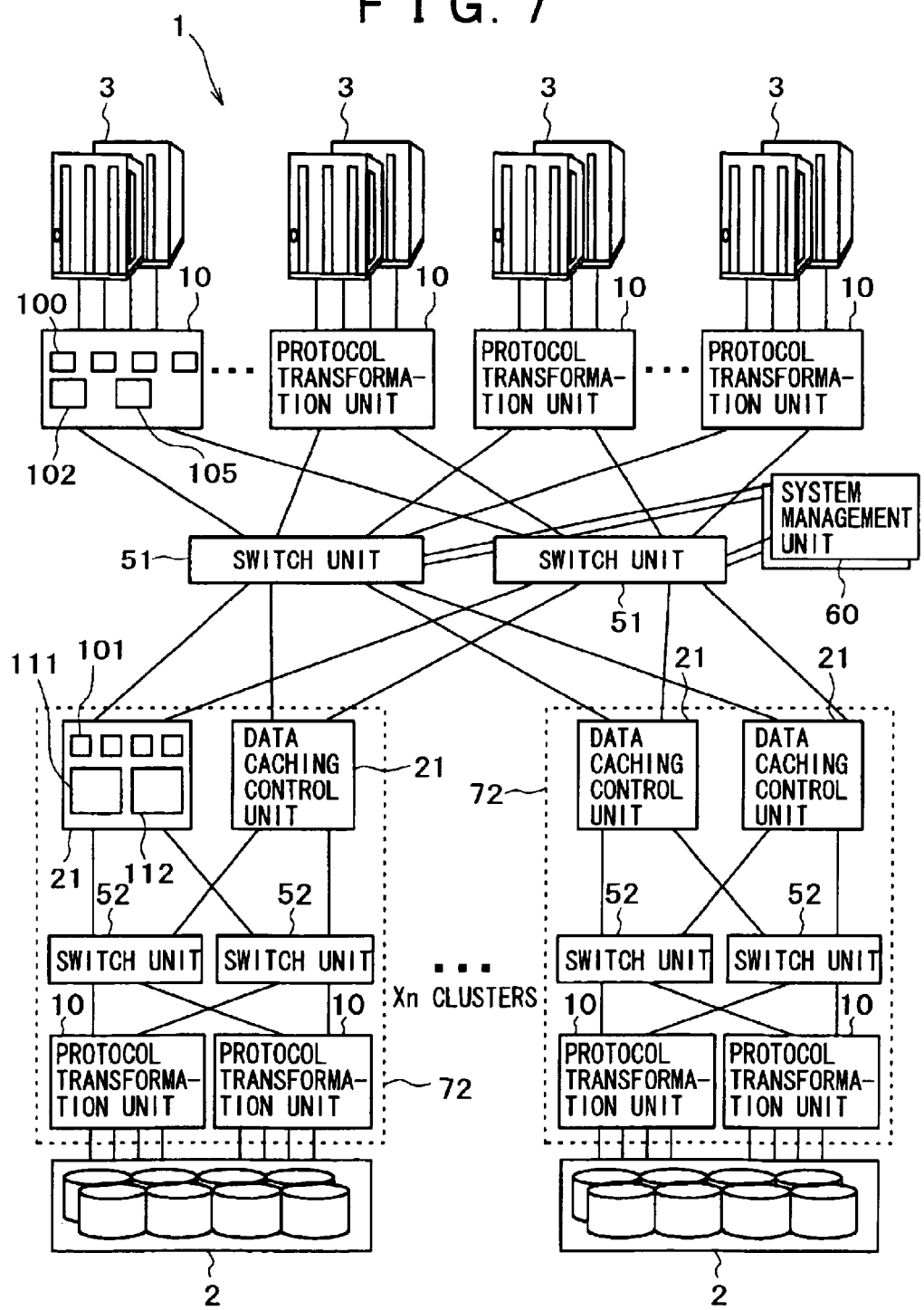
FIG. 7 is a detailed block diagram of the storage system with interconnections in the second embodiment of the present invention.

FIGS. 5 and 7 show the storage systems 1 in the second embodiment of the present invention. The configuration of the storage system 1 shown in FIG. 5 is the same as that in the first embodiment shown in FIG. 1 except that the interconnection 31 used for the connection between the protocol transformation units 10 connected to the servers 3 and the data caching control units 21 is independent physically of the interconnection 35 used for the connection between the protocol transformation units 10 connected to the hard drives 2 and the data caching control units 21 Because the interconnections 31 and 35 are independent of each other physically such way, the two interconnections 31 and 35 are not connected to each other directly.

FIG. 7 shows both of the interconnections 31 and 35 configured by a switch unit 51 and a switch unit 52 respectively. The switch unit 52 is a variation of the switch unit 51 shown in FIG. 22; the switch unit 52 has four path IFs in total.

Because the interconnections 31 and 35 are configured as described above, the two devices 31 and 35 might cause the system cost to rise. However, such the configuration can avoid the interference that has often occurred in the data transfer between the protocol transformation units 10 connected to the servers 3 and the data caching control units 21 and the data transfer between the protocol transformation units 10 connected to the hard drives 2 and the data caching control units 21 as shown in the configuration shown in FIG. 1. In addition, it is possible to configure each of the interconnections 31 and 35 so as to match with the performance required for each of such the two types of data transfers. Thus, the performance of the storage system 1 is improved.

Even in this second embodiment, it is possible to obtain the same effect as that in the first embodiment, so that the storage system 1 can be provided at prices/performance in correspondence with from small to large configurations appropriately to various system scales.

Figure 24:
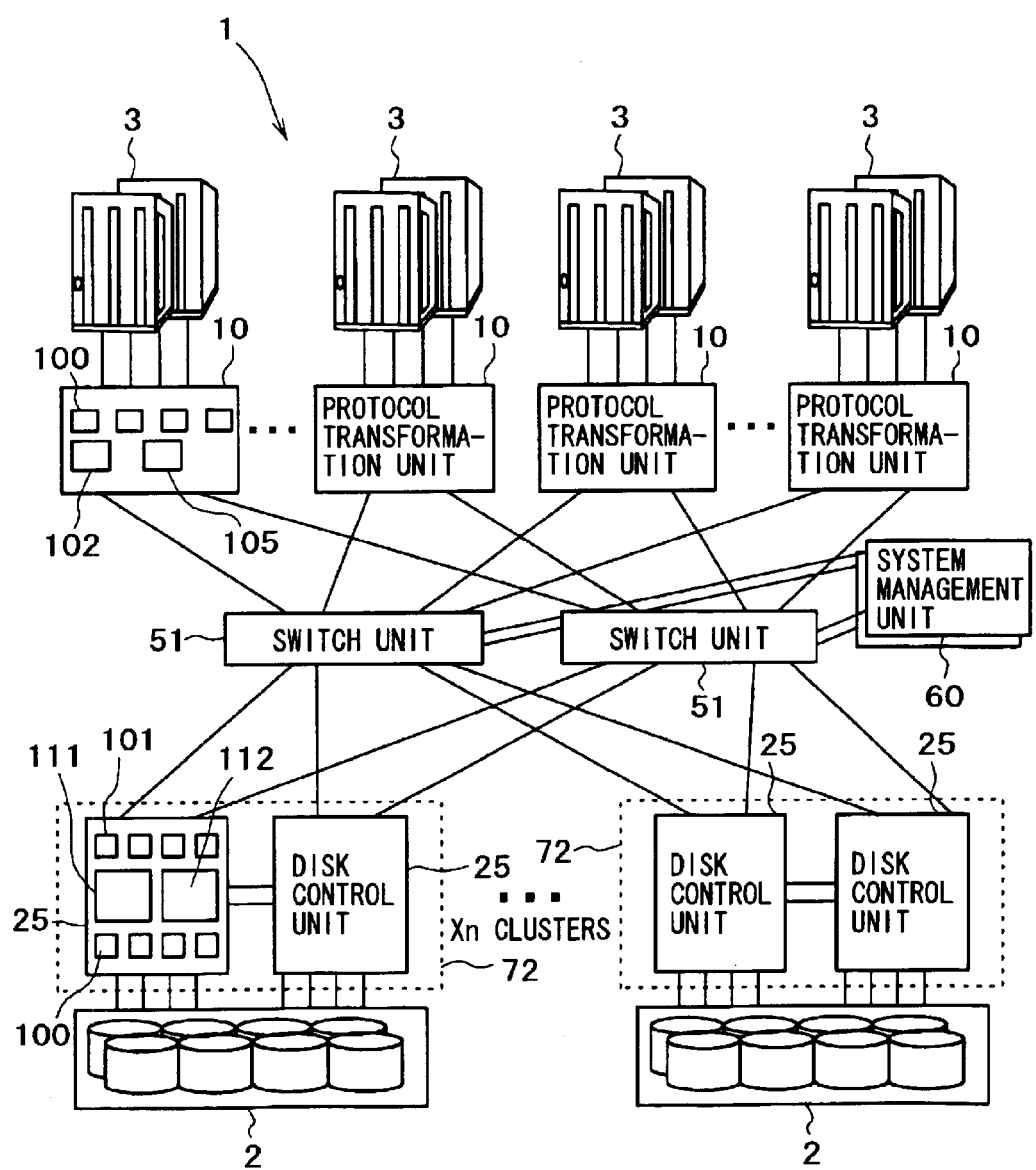
FIG. 24 is another block diagram of the storage system in the second embodiment of the present invention.

Furthermore, as shown in FIG. 24, it is also possible to integrate the functions of each data caching control unit 21 and each protocol transformation unit 10 connected to the hard drives 2 into one disk control unit 25 mounted on one printed circuit board to realize the present invention.

Figure 25:
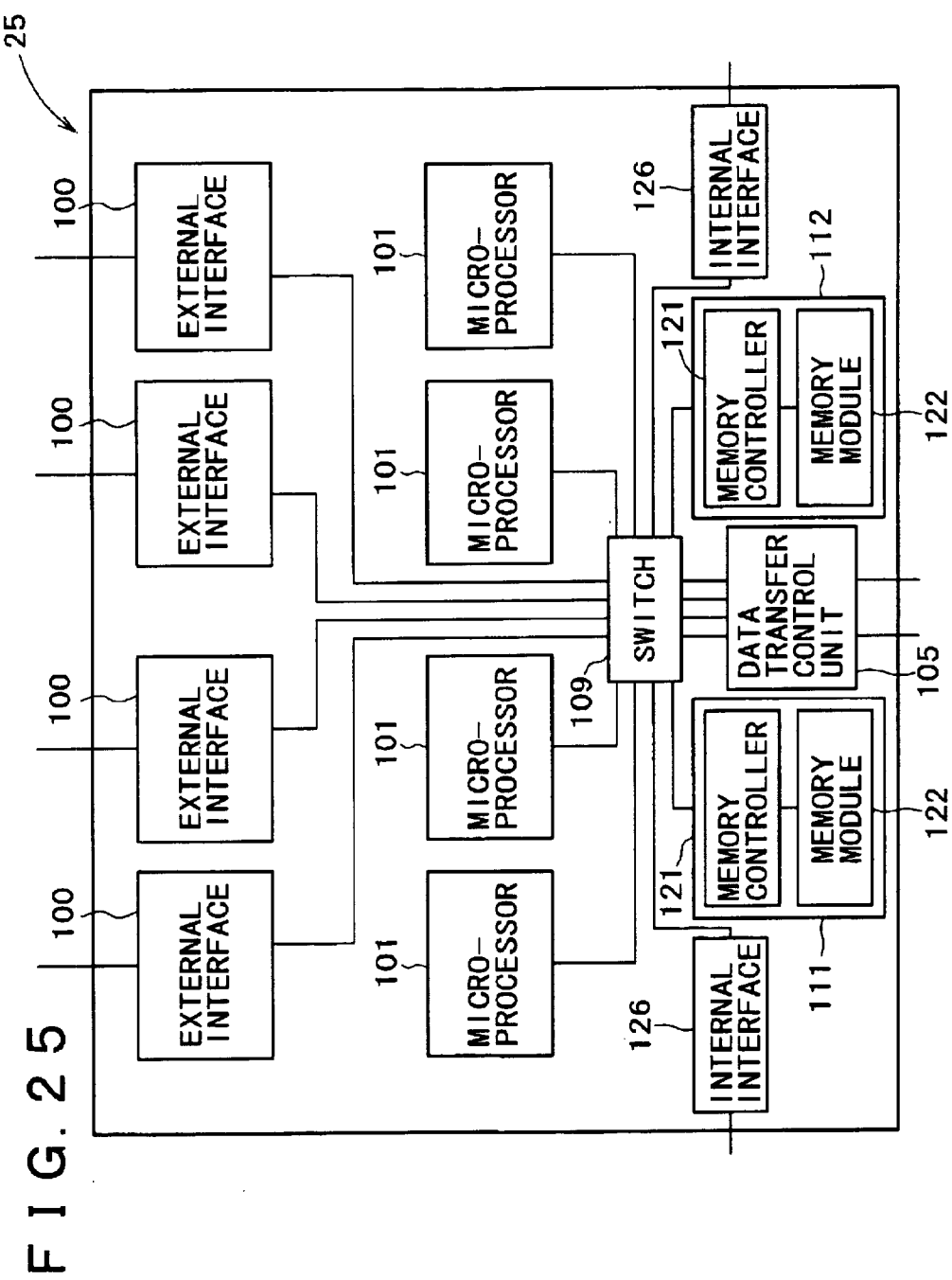
FIG. 25 is a block diagram of a disk control unit included in the storage system of the present invention.
Figure 26:
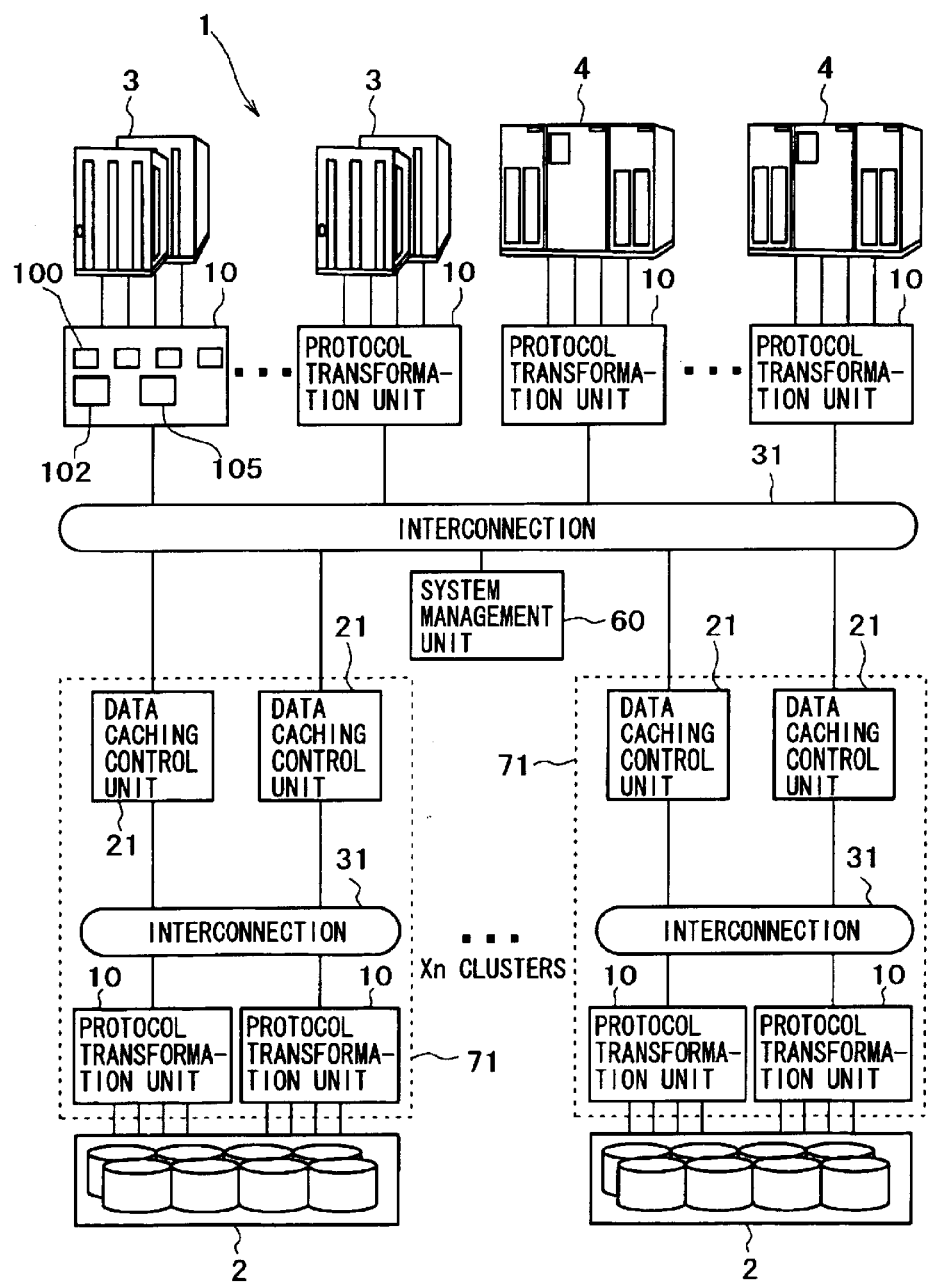
FIG. 26 is a block diagram for describing how an external equipment is connected to a protocol transformation unit in the storage system of the present invention.

FIG. 25 shows a concrete example of such the disk control unit 25. The disk control unit 25 includes at least four microprocessors 101, a data transfer control unit 105 for controlling data and control information transfer to/from the protocol control units 10 or system management units 60, four IFs (external IFs) 100 with the hard drives 2, a cache memory unit 111 for storing data to be written or read/into/ from the hard drives 2, and a control memory unit 112 for storing control information related to transferring data, managing the cache memory unit 111, and the management of the hard drives 2. Each of the cache memory unit 111 and the control memory unit 112 is configured by a memory module 122 and a memory controller for controlling 121 the access to the memory module 122. In this case, the same memory controller 121 and the same memory module 122 may be used to configure both of the cache memory unit 111 and the control memory unit 112 so that both cache memory area and control memory area are allocated in different areas in one memory space. Each of the four microprocessor 101 has a memory (not shown) connected thereto as a main memory. The four microprocessors 101 may also be configured as an SMP respectively so that they can share the cache memory unit 111 and the control memory unit 112 as their main memory.

The number of each system component described above is just an example; the number may be varied as needed. The microprocessors 101, the cache memory unit 111, the control memory unit 112, the external IFs 100, and the data transfer control unit 105 are connected to each another through a switch 109. Each microprocessor 101 controls the reading/ writing of data from/in the cache memory, the directory management in the cache memory, the data transfer between the protocol transformation units 10 and the hard drives 2, and the system management information transfer to/from the system management units 60. The microprocessor 101 also performs the process for redundancy, that is, a RAID processing for the data to be written in the hard drives 2.

The connection configuration among the microprocessors 101, the cache memory unit 111, the control memory unit 112, the external IFs 100, and the data transfer control unit 105 is just an example; the configuration may be varied as needed if each microprocessor 101 can control the cache memory unit 111, the control memory unit 112, the external IF 100, and the data transfer control unit 105 respectively.

Furthermore, as shown in FIG. 24, because data and control information are transferred between the two disk control units 25 included in a control cluster, two internal IFs 126 are connected to the switch 109. And, the internal IFs 126 of the two disk control units 25 are connected to each other through a connection path so that the data and the control information are transferred through the connection path. For example, if the information to be stored in the cache memory units 111 or control memory units 112 of the two disk control units is duplicated, the storage system operation can continue nonstop even when an error occurs in one of the two disk control units 25, since the operation is passed over to the other disk control unit 25. The reliability of the storage system is thus improved.

As described above, because the functions of each cache control unit 21 and each protocol transformation unit 10 connected to the hard drives 2 are integrated into one disk control unit 25 mounted on one printed circuit board, the communication between the cache control unit 21 and the protocol transformation unit 10 through the switch unit 52 can be omitted, thereby the data transfer performance of the storage system is improved. In addition, because the number of parts in each control cluster 72 is reduced, the storage system cost can also be reduced.

Figure 3:
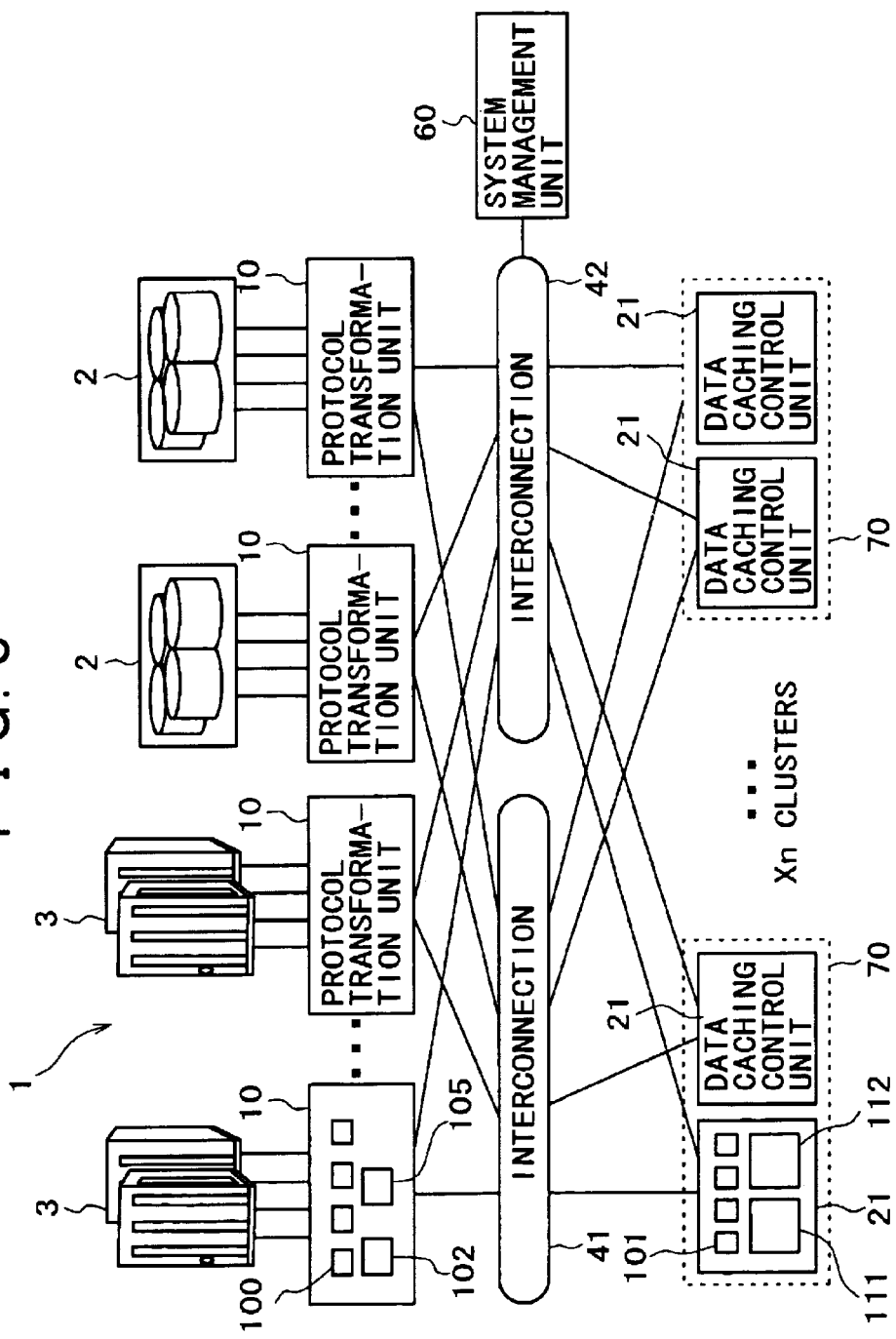
FIG. 3 is a block diagram of a storage system in the third embodiment of the present invention.

FIG. 3 shows a storage system 1 in the third embodiment of the present invention. The storage system 1 shown in FIG. 3 is the same as that in the first embodiment shown in FIG. 1 except that the interconnection 31 is divided in an interconnection 41 and an interconnection 42 and the system management units 60 is connected to the interconnection 42 in FIG. 3.

The interconnection 41 is dedicated to data transfer while the interconnection 42 is dedicated to control information transfer. This is why the system management units 60 used to manage the storage system 1 is connected to the interconnection 42.

Such the configuration of the storage system 1 can eliminate the interference to occur between data transfer and control information transfer. In addition, each of the interconnections 41 and 42 can be configured so as to match the performance required for each of the data transfer and control information transfer, thereby the performance of the storage system 1 is improved.

Any of the configurations in the first embodiment shown in FIG. 4 and in the second embodiment shown in FIG. 5 can be replaced with the configuration in this third embodiment to realize the present invention.

Furthermore, the configuration in this third embodiment can obtain the same effect as that in the first embodiment, so that it is possible to provide storage systems at reasonable prices/performance in correspondence with small to large configurations appropriately to the required system scale.

Figure 20:
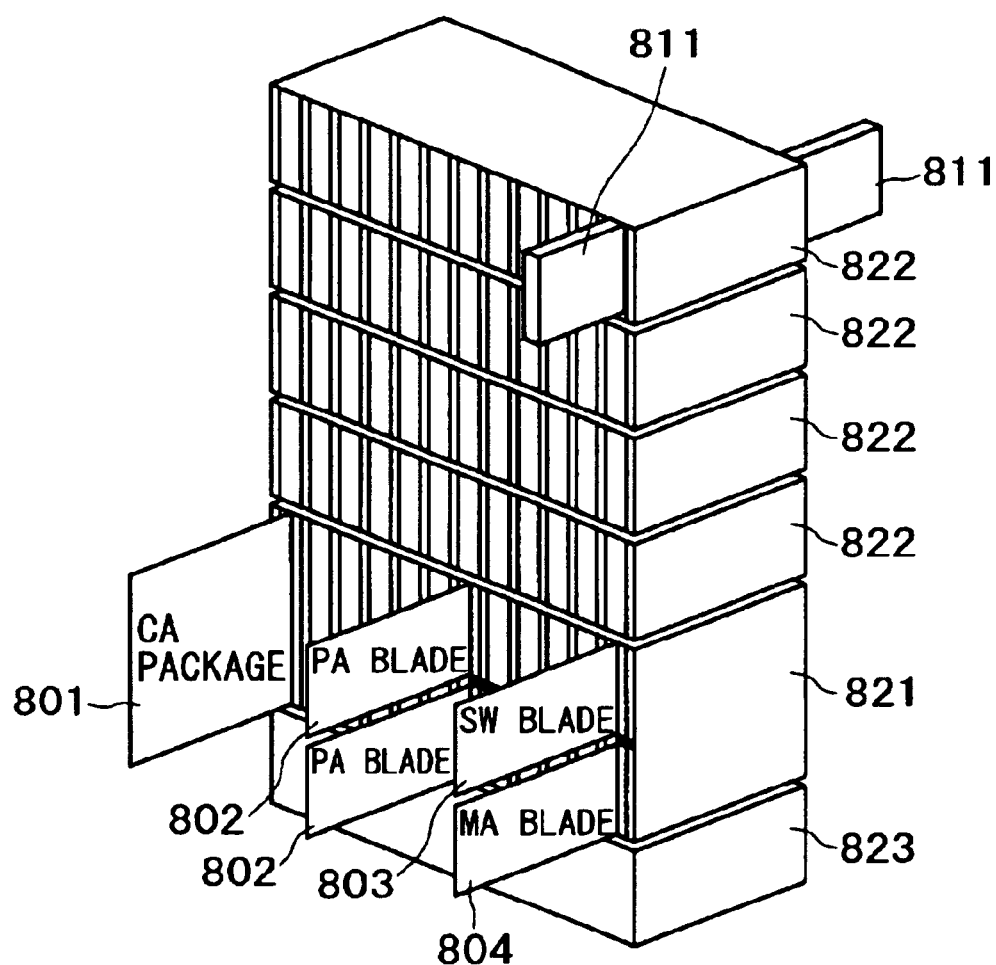
FIG. 20 is an example of housing of the storage system of the present invention in a rack.
Figure 21:
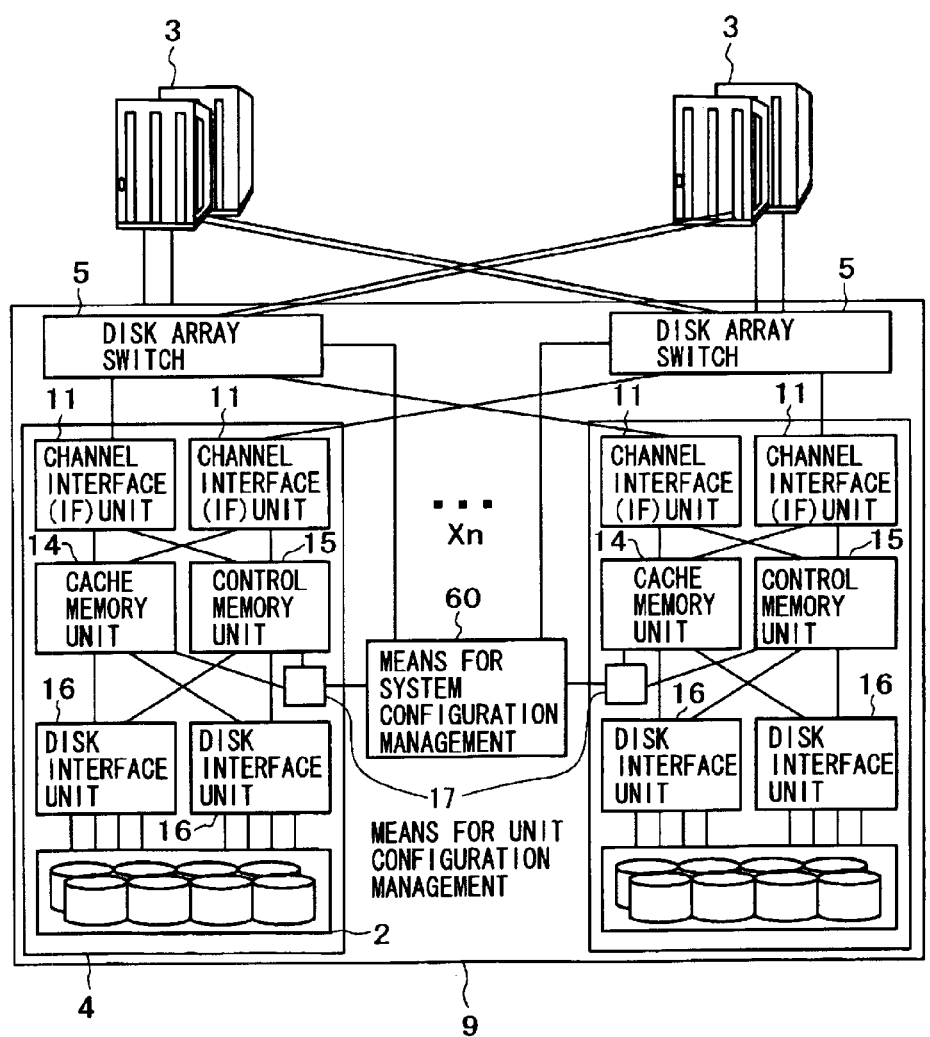
FIG. 21 is another block diagram of the conventional storage system.

FIG. 20 shows the storage system 1 housed in a cabinet and configured as shown in FIG. 6 in the first embodiment or in FIG. 7 in the second embodiment.

The protocol transformation units (PA) 10, the data caching control units (CA) 21, the system management units (MA) 60, and the switch units 51/52 are mounted on packages and housed in a control unit chassis 821 as PA blades 802, CA packages 801, MA blades 804, and SW blades 803. On the back side of the control unit chassis 821 is a back plane (not shown). Each of the packages and blades is connected to the back plane through a connector. Wirings are formed on the back plane for the connection between each package and each blade as shown in FIGS. 6 and 7 (connection configurations).

In this connection, the number of processors and the memory capacity in each data caching control unit 21 increase inevitably more than those of each protocol transformation unit 10 and the system management units 60, so that the area of the CA package 801 is allocated about doubly that of the other blades. Those packages and blades may use general/dedicated blade servers and run dedicated software programs therein respectively.

On the control unit chassis 821 are disposed four disk unit chassis 822 on which hard disk units 811 are mounted. Under the control unit chassis 821 is disposed a power unit chassis 823 that houses power units for supplying a power to the whole storage system 1.

Those chassis are all housed in a 19-inch rack (not shown). The number of each component housed in the rack is an example; the number is varied as needed.

According to the present invention, therefore, it is possible to provide a storage system that can realize a scalability of both cost and performance and enabled to correspond to small to large scale configurations while the shared memory of the storage system, which has been a bottleneck in the development, is eliminated and the small configuration storage systems are reduced in cost.

System And Method Implementation

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical disks, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, creating a first table on correspondence that denotes a relationship between each of a plurality of physical storage areas and each of a plurality of types of logical storage areas, creating a second table on correspondence that denotes at least one of, a relationship on connection between the external equipment connected to the protocol transformation units, and a relationship between the external equipment and the logical storage areas at the time of initial system setup, storing both of the first and second tables on correspondence in memory of the system management units, distributing a copy of at least a portion of one of the first table and the second table to one of a target protocol transformation unit and a data caching control unit, and storing the copy in memory of one of the target protocol transformation unit and the caching control unit, according to processes of the present invention.

Other Embodiments

The present invention includes, but is not limited to, the following additional embodiments.

A storage system is provided that has a plurality of clusters. Each of the plurality of clusters comprises a hard disk unit; a disk adapter for connecting the hard disk unit to a communication path; and a cache adapter connected to the communication path, the cache adapter including, a cache memory for storing a copy of at least part of data stored in the hard disk unit, a shared memory for storing an instruction for accessing the cache memory, and a processor for accessing the shared memory.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A storage systemcomprising:
a plurality of protocol transformation units, each having an interface with external equipment, each being configured to transform one of a read and a write protocol of data to be exchanged with the external equipment into an internal protocol used in the storage system;
a plurality of data caching control units, each having a cache memory for storing data to be one of read from and written into the external equipment, and a function for controlling the cache memory;
an interconnection configured to connect the plurality of protocol transformation units and the plurality of data caching control units, wherein the plurality of data caching control units are divided into a plurality of control clusters, and wherein each cache memory is controlled only in its corresponding control cluster independently; and
a system management unit configured to manage the plurality of protocol transformation units and the plurality of control clusters intearallv as one system,
wherein the interconnection is divided to include
a first interconnection for transferring data to be one of read from and written in the external equipment, and
a second interconnection for transferring control information used to manage the storage system, wherein the system management unit is connected to the second interconnection.

2. A storage system comprising:
a plurality of first protocol transformation units, each having an interface with external equipment, each being configured to transform one of a read and a write protocol of data to be exchanaed with the external equipment into an internal protocol used in the storage system;
a plurality of second protocol transformation units, each having an interface with a hard disk unit, each being configured to transform one of a read and write protocol of data to be exchanged with the hard disk unit into to an internal protocol used in the storage system;
a plurality of data caching control units, each having a cache memory for storing data to be one of read from and written in the hard disk unit, and a function for controlling the cache memory;
a first interconnection configured to connect the plurality of first protocol transformation units and the plurality of data caching control units, wherein the plurality of data caching control units and the plurality of second protocol transformation units are divided into a plurality of control clusters, each including a given number of the data caching control units and a given number of the second protocol transformation units respectively, and wherein a second interconnection is configured to connect the data caching control units and the second protocol transformation units in each of the control clusters, and wherein each cache memory of the plurality of data caching control units in the plurality of control clusters stores only the data to be stored in the plurality of hard disk units connected to the second protocol transformation units in each control cluster, and wherein the cache memory is controlled and the plurality of hard disk units are managed only in a corresponding control cluster independently; and a system management unit configured to manage the plurality of first protocol transformation units and the plurality of control clusters integrally as one system, wherein each of the data caching control units has a processor configured to transfer data via the cache memory between the first protocol transformation unit and the second protocol transformation unit, and further configured to control the cache memory.

3. A storage system comprising:

a plurality of first protocol transformation units, each having an interface with external equipment, each being configured to transform one of a read and a write protocol of data to be exchanged with the external equipment into an internal protocol used in the storage system;

a plurality of second protocol transformation units, each having an interface with a hard disk unit, each being configured to transform one of a read and write protocol of data to be exchanged with the hard disk unit into to an internal protocol used in the storage system;

a plurality of data caching control units, each having a cache memory for storing data to be one of read from and written in the hard disk unit, and a function for controlling the cache memory;

a first interconnection configured to connect the plurality of first protocol transformation units and the plurality of data caching control units, wherein the plurality of data caching control units and the plurality of second protocol transformation units are divided into a plurality of control clusters, each including a given number of the data caching control units and a given number of the second protocol transformation units respectively, and wherein a second interconnection is configured to connect the data caching control units and the second protocol transformation units in each of the control clusters, and wherein each cache memory of the plurality of data caching control units in the plurality of control clusters stores only the data to be stored in the plurality of hard disk units connected to the second protocol transformation units in each control cluster, and wherein the cache memory is controlled and the plurality of hard disk units are managed only in a corresponding control cluster independently; and a system management unit configured to manage the plurality of first protocol transformation units and the plurality of control clusters integrally as one system, wherein the data caching control units and the second protocol transformation units are mounted on a same printed circuit board.

4. A storage system comprising:

a plurality of first protocol transformation units, each having an interface with external equipment, each being configured to transform one of a read and a write protocol of data to be exchanged with the external equipment into an internal protocol used in the storage system:

a plurality of second protocol transformation units, each having an interface with a hard disk unit, each being configured to transform one of a read and write protocol of data to be exchanged with the hard disk unit into to an internal protocol used in the storage system;

a plurality of data caching control units, each having a cache memory for storing data to be one of read from and written in the hard disk unit, and a function for controlling the cache memory;

a first interconnection configured to connect the plurality of first protocol transformation units and the plurality of data caching control units, wherein the plurality of data caching control units and the plurality of second protocol transformation units are divided into a plurality of control clusters, each including a given number of the data caching control units and a given number of the second protocol transformation units respectively, and wherein a second interconnection is configured to connect the data caching control units and the second protocol transformation units in each of the control clusters and wherein each cache memory of the plurality of data caching control units in the plurality of control clusters stores only the data to be stored in the plurality of hard disk units connected to the second protocol transformation units in each control cluster, and wherein the cache memory is controlled and the plurality of hard disk units are managed only in a corresponding control cluster independently; and a system management unit configured to manage the plurality of first protocol transformation units and the plurality of control clusters integrally as one system, wherein the system management unit is configured to control data transfer amongst the plurality of first protocol transformation units.

5. The storage system of claim 4, wherein the cache memory in each of the data caching control units is configured to store data to be transferred amongst the plurality of first protocol transformation units.

6. The storage system of claim 4, wherein the system management unit has a memory configured to store data to be transferred among the plurality of first protocol transformation units.

7. The storage system of claim 4, wherein data is transferred between the plurality of first protocol transformation units through a data caching control unit.

8. A storage system comprising:

a plurality of first protocol transformation units, each having an interface with external equipment, each being configured to transform one of a read and a write protocol of data to be exchanged with the external equipment into an internal protocol used in the storage system;

a plurality of second protocol transformation units, each having an interface with a hard disk unit, each being configured to transform one of a read and write protocol of data to be exchanged with the hard disk unit into to an internal protocol used in the storage system:

a plurality of data caching control units, each having a cache memory for storing data to be one of read from and written in the hard disk unit, and a function for controlling the cache memory;

a first interconnection configured to connect the plurality of first protocol transformation units and the plurality of data caching control units, wherein the plurality of data caching control units and the plurality of second protocol transformation units are divided into a plurality of control clusters, each including a given number of the data caching control units and a given number of the second protocol transformation units respectively, and wherein a second interconnection is configured to connect the data caching control units and the second protocol transformation units in each of the control clusters, and wherein each cache memory of the plurality of data cacbing control units in the plurality of control clusters stores only the data to be stored in the plurality of hard disk units connected to the second protocol transformation units in each control cluster, and wherein the cache memory is controlled and the plurality of hard disk units are managed only in a corresponding control cluster independently; and a system management unit configured to manage the plurality of first protocol transformation units and the plurality of control clusters intearally as one system, wherein one or more external equipments provided with data processing functions and one or more second storage systems are connected to the interface with the external equipment of the plurality of first protocol transformation units, and wherein data is transferred between each first protocol transformation unit connected to the one or more external equipments and each first protocol transformation unit connected to the one or more second storage systems through the first interconnection so as to enable data transfer between the one or more external equipments and the one or more second storage system.

9. A storage system comprising:

a plurality of first protocol transformation units, each having an interface with external equipment, each being configured to transform one of a read and a write protocol of data to be exchanged with the external equipment into an internal protocol used in the storage system;

a plurality of second protocol transformation units, each having an interface with a hard disk unit, each being configured to transform one of a read and write protocol of data to be exchanged with the hard disk unit into to an internal protocol used in the storage system;

a plurality of data caching control units, each having a cache memory for storing data to be one of read from and written in the hard disk unit, and a function for controlling the cache memory;

a first interconnection conflaured to connect the plurality of first protocol transformation units and the plurality of data caching control units, wherein the plurality of data caching control units and the plurality of second protocol transformation units are divided into a plurality of control clusters, each including a given number of the data caching control units and a given number of the second protocol transformation units respectively, and wherein a second interconnection is configured to connect the data caching control units and the second protocol transformation units in each of the control clusters, and wherein each cache memory of the plurality of data caching control units in the plurality of control clusters stores only the data to be stored in the plurality of hard disk units connected to the second protocol transformation units in each control cluster, and wherein the cache memory is controlled and the plurality of hard disk units are managed only in a corresponding control cluster independently; and a system management unit configured to manage the plurality of first protocol transformation units and the plurality of control clusters integrally as one system, wherein one or more external equipments provided with data processing functions and one or more second storage systems are connected to the interface with the external equipment of the plurality of first protocol transformation units, and wherein data is transferred between each first protocol transformation unit connected to the one or more external equipments and each first protocol transformation unit connected to the one or more second storage systems through the first interconnection and through the data caching control unit so as to enable data transfer between the one or more external equipments and the one or more second storage system.

10. The storage system of claim 9, wherein the system management unit manages a logical volume supplied from the second storage system as the storage system volume, and wherein the system management unit has a function for supplying volume to the external equipment provided with a data processing function.

11. A storage system comprising:

a plurality of protocol transformation units, each having an interface with external equipment, each being configured to transform one of a read and a write protocol of data to be exchanged with the external equipment into an internal protocol used in the storage system;

a plurality of data caching control units, each having a cache memory for storing data to be one of read from and written into the external equipment, and a function for controlling the cache memory;

an interconnection configured to connect the plurality of protocol transformation units and the plurality of data caching control units, wherein the plurality of data caching control units are divided into a plurality of control clusters, and wherein each cache memory is controlled only in its corresponding control cluster independently; and a system management unit configured to manage the plurality of protocol transformation units and the plurality of control clusters integrally as one system, wherein the system management unit is divided to include;

a first management unit for managing the interconnection, and a second management unit for managing a relationship between a plurality of physical storage areas in the storage system and a plurality of types of logical storage areas, and at least one of, a connection relationship between the external equipments connected to the protocol transformation units, a relationship between the external equipment and the logical storage areas, and errors occurring in the system.

12. A storage system comprising:

a plurality of protocol transformation units, each having an interface with external equipment, each being configured to transform one of a read and a write protocol of data to be exchanged with the external equipment into an internal protocol used in the storage system;

a plurality of data caching control units, each having a cache memory for storing data to be one of read from and written into the external equipment, and a function for controlling the cache memory;

an interconnection configured to connect the plurality of protocol transformation units and the plurality of data caching control units, wherein the plurality of data caching control units are divided into a plurality of control clusters, and wherein each cache memory is controlled only in its corresponding control cluster independently; and a system management unit configured to manage the plurality of protocol transformation units and the plurality of control clusters integrally as one system, wherein the system management unit is divided to include;

a first management unit for managing the physical connection in the interconnections, a second management unit for managing a logical path throughout the interconnection; and a third management unit for managing a relationship between physical storage areas of the plurality of hard disk units and the plurality of types of logical storage areas, and at least one of, a connection relationship between the external equipments connected to the protocol transformation units, a relationship between the external equipment and the logical storage areas, and errors occurring in the system.

13. A method for managing a storage system comprising:

providing a storage system including: a plurality of protocol transformation units, each having an interface with external equipment, each being configured to transform one of a read and a write protocol of data to be exchanged with the external equipment into an internal protocol used in the storage system; and a plurality of data caching control units, each having a cache memory for storing data to be one of read from and written into the external equipment, and a function for controlling the cache memory; an interconnection configured to connect the plurality of protocol transformation units and the plurality of data caching control units, wherein the plurality of data caching control units are divided into a plurality of control clusters, and wherein each cache memory is controlled only in its corresponding control cluster independently; and a system management unit configured to manage the plurality of protocol transformation units and the plurality of control clusters integrally as one system, wherein the system management unit is divided to include a first management unit for managing the interconnection, and a second management unit for managing a relationship between a plurality of physical storage areas in the storage system and a plurality of types of logical storage areas, and at least one of, a connection relationship between the external equipments connected to the protocol transformation units, a relationship between the external equipment and the logical storage areas, and errors occurring in the system, and wherein each of the system management units, each of the protocol transformation units, and each of the data caching control units, has a memory for storing control information wherein near a time of initial system setup;

creating a first table that denotes a relationship between each of the plurality of physical storage areas and each of the plurality of types of logical storage areas;

creating a second table that denotes at least one of, a relationship on connection between the external equipments connected to the protocol transformation units, and a relationship between the external equipment and the logical storage areas;

storing both of the first and second tables in memory of the system management units;

distributing a copy of at least a portion of one of the first table and the second table to one of a related protocol transformation unit and a related data caching control unit; and storing the copy in memory of the related protocol transformation unit and the related data caching control unit.

14. The method of claim 13, wherein the storage system has a management console for communicating with the system management unit, the method further comprising:

displaying at least part of the first and second tables on a monitor of the management console;

setting at least part of a relationship between the plurality of physical storage areas and the plurality of types of logical storage areas created at an initial system setup time, and at least one of a connection relationship between external equipments connected to the protocol transformation units, and a relationship between the external equipments and the logical storage areas.

15. The method of claim 13, wherein the protocol transformation unit is configured to refer to the copy in response to one of a read request or a write request received from the external equipment to perform the steps of:

deciding an appropriate data caching control unit or protocol control unit to transfer one of the read request and the write request, and avoiding access the system management unit.

* * * * *